(12) United States Patent
Morley et al.

(10) Patent No.: US 6,507,890 B1
(45) Date of Patent: Jan. 14, 2003

(54) SYSTEM AND METHOD FOR EXPANDING A LOG STRUCTURE IN A DISK ARRAY

(75) Inventors: Steve Morley, Upton, MA (US); Robert C. Solomon, Kensington, NH (US); David DesRoches, Methuen, MA (US); John Percy, Cumberland, RI (US)

(73) Assignee: EMC Corporation, Hopkinton, MA (US)

( * ) Notice: Subject to any disclaimer, the term of this patent is extended or adjusted under 35 U.S.C. 154(b) by 241 days.

(21) Appl. No.: 09/676,222

(22) Filed: Sep. 29, 2000

(51) Int. Cl.$^7$ .............................................. G06F 12/00
(52) U.S. Cl. ...................................................... 711/114
(58) Field of Search ......................................... 711/114

(56) References Cited

U.S. PATENT DOCUMENTS

| | | | |
|---|---|---|---|
| 4,761,785 A | 8/1988 | Clark et al. | 371/51 |
| 5,524,204 A | 6/1996 | Verdoorn, Jr. | 395/182.04 |
| 5,829,053 A | 10/1998 | Smith et al. | 711/202 |
| 5,875,456 A | 2/1999 | Stallmo et al. | 711/114 |

OTHER PUBLICATIONS

Rosenblum et al., "The Design and Implementation of a Log–Structured File System" ACM Transactions on Computer Systems vol. 10, No. 1, pp. 26–52 Feb. 1992.

Matthews et al., "Improving the Performance of Log–Structured File Systems with Adaptive Methods" Proc. Sixteenth ACM Symposium on Operating System Principles Oct. 1997 [Retrieved on Jun. 13, 2000] Retrieved from Internet: <URL:http://.cs.berkeley.edu/~neefe/papers/sosp97/sosp97.htm>.

Whitaker et al., "Design of the Server for the Spiralog File System" Compaq Digital Technical Journal Oct. 15, 1966 [Retrieved Jun. 13, 2000] Retrieved from Internet: <URL:http://www.digital.com/DTJM02HM.HTM>.

"RAID: Use of Log Disks for an Efficient RAID Design" IBM Technical Disclosure Bulletin pp. 19–20 Feb. 1994.

"Reducing Data Movement in Log Structure File System Garbage Collection" IBM Technical Disclosure Bulletin pp. 323–326 Feb. 1995.

*Primary Examiner*—Kevin Verbrugge
(74) *Attorney, Agent, or Firm*—Bromberg & Sunstein LLP

(57) ABSTRACT

A system and method for expanding a log structure in a disk array, the disk array being expanded from M-width to N-width, the disk array including a storage level, the log structure including one or more sequential used segments, the one or more sequential used segments including live data, locates one or more sequential used segments, writes live data from the one or more located segments to the storage level, enlarges the size of the one or more located segments from M-width to N-width, and places the one or more enlarged segments on a first free segment list.

78 Claims, 16 Drawing Sheets

Figure 9a

Utilization Percent

| Age | 0-20 | 20-40 | 40-60 | 60-80 | 80-100 |
|---|---|---|---|---|---|
| 0 | 400 | 401 | 402 | | |
| 1 | 300 | 301 | 302 | 303 | |
| 2 | 200 | 201 | | | |
| 3 | 100 | 101 | 102 | | |
| 4 | | | | | |

Figure 9b

Utilization Percent

| Age | 0-20 | 20-40 | 40-60 | 60-80 | 80-100 |
|---|---|---|---|---|---|
| 0 | 500 | 501 | 502 | | |
| 1 | 400 | 401 | 402 | | |
| 2 | 300 | 301 | 302 | 303 | |
| 3 | 200 | 201 | | | |
| 4 | 100 | 101 | 102 | | |

Figure 9c

Utilization Percent

| Age | 0-20 | 20-40 | 40-60 | 60-80 | 80-100 |
|---|---|---|---|---|---|
| 0 | 600 | 601 | 602 | 603 | |
| 1 | 500 | 501 | 502 | | |
| 2 | 400 | 401 | 402 | | |
| 3 | 300 | 301 | 302 | 303 | |
| 4 | 200+100 | 201+101 | 102 | | |

Figure 10a

Utilization Percent

| Age | 0-20 | 20-40 | 40-60 | 60-80 | 80-100 |
|---|---|---|---|---|---|
| 0 | 1 | 5 | 9 | 12 | |
| 1 | 2 | 6 | 10 | 13 | |
| 2 | 3 | 7 | 11 | | |
| 3 | 4 | 8 | | | |
| 4 | | | | | |

Utilization Percent

| Age | 0-20 | 20-40 | 40-60 | 60-80 | 80-100 |
|---|---|---|---|---|---|
| 0 | 1 | 3 | 6 | 10 | |
| 1 | 2 | 5 | 9 | 13 | |
| 2 | 4 | 8 | 12 | | |
| 3 | 7 | 11 | | | |
| 4 | | | | | |

Utilization Percent

| Age | 0-20 | 20-40 | 40-60 | 60-80 | 80-100 |
|---|---|---|---|---|---|
| 0 | 1 | 4 | 9 | 12 | |
| 1 | 2 | 5 | 10 | 13 | |
| 2 | 3 | 7 | 11 | | |
| 3 | 6 | 8 | | | |
| 4 | | | | | |

1000

SYSTEM AND METHOD FOR EXPANDING A LOG STRUCTURE IN A DISK ARRAY

CROSS REFERENCE TO RELATED APPLICATIONS

This application is related to U.S. patent application Ser. No. 09/614,820, filed Jul. 12, 2000, entitled METHOD AND APPARATUS FOR PREPARING A DISK FOR USE IN A DISK ARRAY, the disclosure of which is incorporated herein, in its entirety, by reference; U.S. patent application Ser. No. 09/614,646, filed Jul. 12, 2000, entitled VIRTUAL DEVICE DRIVER, the disclosure of which is incorporated herein, in its entirety, by reference; U.S. patent application Ser. No. 09/675,423, filed on even date herewith, entitled SYSTEM AND METHOD FOR STORING DATA, naming Steve Morley, Robert C. Solomon, David DesRoches, and John Percy as inventors, the disclosure of which is incorporated herein, in its entirety, by reference; and U.S. patent application Ser. No. 09/675,420, filed on even date herewith, entitled SYSTEM AND METHOD FOR CLEANING A LOG STRUCTURE, naming Steve Morley, Robert C. Solomon, David DesRoches, and John Percy as inventors, the disclosure of which is incorporated herein, in its entirety, by reference.

FIELD OF THE INVENTION

The invention generally relates to disk arrays and, more particularly, the invention relates to expanding a disk array.

BACKGROUND OF THE INVENTION

In general, a computer reads data from, and writes data to, a disk connected to the computer. A disk is capable of storing huge amounts of data. Typically, however, a disk cannot read or write data at, or near, the speed at which the computer communicates with the disk. Thus, the amount of time a disk needs to read or write data, referred to as disk access time, may slow the performance of the computer.

In one method to offset this limitation, the workload of a single disk is distributed across a cluster of disks. In this method, referred to as a disk array, the computer communicates with an input/output control processor which, in turn, communicates with the cluster of disks. To the computer, the disk array appears as a single disk. In general, a disk array having a particular capacity provides better performance, in other words, can better respond to the computer, than a single disk of the same capacity.

In another method to offset this limitation, a portion of system memory is used to "store" the most recent reads and writes from a computer to the disk. This method, referred to as caching, improves performance because a computer can access system memory much faster than a computer can access the disk. However, despite the improvements obtained with disk arrays and caching, disk access time still continues to slow the performance of a computer.

Taking a different approach to improving disk performance, Mendel Rosenblum and John K. Ousterhout introduced, in the article "The Design and Implementation of a Log-Structured File System," ACM Transactions on Computer Systems, February 1992, a new disk storage structure called a log-structured file system. In a log-structured file system, the computer, or input/output control processor, writes data to the disk in a sequential structure, referred to as a log. In general, a log improves the write performance of a disk because a log eliminates the time needed for the disk to, for example, find the location in which previously stored data is located and overwrite the previously stored data with newly modified data. However, because the disk writes data to the end of the log, the disk needs free space available at the end of the log in which to write the newly modified data, or in which to write new data.

To resolve the problem of free space, Rosenblum and Ousterhout divided the log into segments. A segment can be rewritten when the live data in the segment has been copied out of the segment. A segment cleaner process packs the live data from various segments and rewrites the packed live data to, for example, the beginning of the log.

As noted, though, a log-based file structure improves the write performance of a disk, as opposed to the read performance of a disk. Thus, a log-based file structure improves a disk's performance when, among other things, most of the read requests from a computer, or input/output control processor, to a disk drive are found in memory-based cache. When most of the read requests are not found in memory-based cache, however, the performance of a disk configured as a log structure is no better than the performance of a disk configured as a more conventional structure in which, for example, the disk must first find the location in which previously stored data is located and then overwrite the previously stored data with newly modified data.

SUMMARY OF THE INVENTION

In accordance with one aspect of the invention, a system and method for expanding a log structure in a disk array, wherein the disk array is being expanded from M-width to N-width, the disk array includes a storage level, the log structure includes one or more sequential used segments, and the one or more sequential used segments includes live data, the system and method locates one or more sequential used segments, writes live data from the one or more located segments to the storage level, enlarges the size of the one or more located segments from M-width to N-width, and places the one or more enlarged segments on a first free segment list.

In a further embodiment of this invention, the system and method includes repeating the above four processes for at least one more sequential used segment. In this embodiment, the system and method may use a pointer to track progression through the log structure. In an alternate embodiment of this further embodiment, the disk array may include a second free segment list. In this alternate embodiment, the process of repeating the above four processes may include placing at least one enlarged segment on the second free segment list. In addition, the system and method may use the enlarged segments placed on the first free segment list and the second free segment list to continue the operation of the log structure during the expansion.

In accordance with another aspect of the invention, a system and method for expanding a log structure in a disk array, wherein the disk array is being expanded from M-width to N-width, the disk array includes a storage level, the log structure includes unused segments and sequential used segments, the unused segments are located on a first free segment list and second free segment list, and the sequential used segments include live data, the system and method clears the first free segment list and the second free segment list, locates one or more sequential used segments, writes live data from the one or more located segments to the storage level, enlarges the size of the one or more located segments from M-width to N-width, and places the one or more enlarged segments on the first free segment list.

In a further embodiment of this invention, the system and method includes repeating the last four processes for at least one more sequential used segment. In this embodiment, the system and method may use a pointer to track progression through the log structure. In an alternate embodiment of this further embodiment, the process of repeating the last four processes may include placing at least one enlarged segment on the second free segment list. In addition, the system and method may use the enlarged segments placed on the first free segment list and the second free segment list to continue the operation of the log structure during the expansion.

In a further embodiment of both aspects of the invention, the system and method uses the one or more enlarged segments placed on the first free segment list to continue the operation of the log structure during the expansion.

In alternate embodiments of the both aspects of the invention, the log structure may be configured as a Redundant Array of Independent Disks structure. In addition, the storage level may be configured as a Redundant Array of Independent Disks structure.

BRIEF DESCRIPTION OF THE DRAWINGS

The foregoing and other objects and advantages of the invention will be appreciated more fully from the following further description thereof with reference to the accompanying drawings wherein:

FIGS. 9a through 9c show exemplary functional layouts for a cleaning matrix.

FIGS. 10a through 10c show exemplary functional layouts of traversed cleaning matrices.

DETAILED DESCRIPTION OF THE PREFERRED EMBODIMENTS

In accordance with one embodiment of the invention, data is stored on a disk, or cluster of disks, using a hierarchical architecture. In general, the hierarchical architecture has three levels-two "cache" levels and one "storage" level.

For ease of reference, the term "system" is used herein to refer to the device that reads data from, and writes data to, a disk. The term refers to all types of devices, including personal computers, mainframes, input/output control processors, general-purpose servers, and dedicated servers. Thus, for example, a system may access a disk that is part of a personal computer, a system may access a disk array that is part of a mainframe, a system may access a disk that is part of a storage area network, or a system may access a disk that is part of network-attached storage. The system may reside on, for example, a host computer, a storage processor, or a disk. In addition, the system may be implemented in hardware, software, or a combination of hardware and software.

A. The Log Structure

Figure 1:
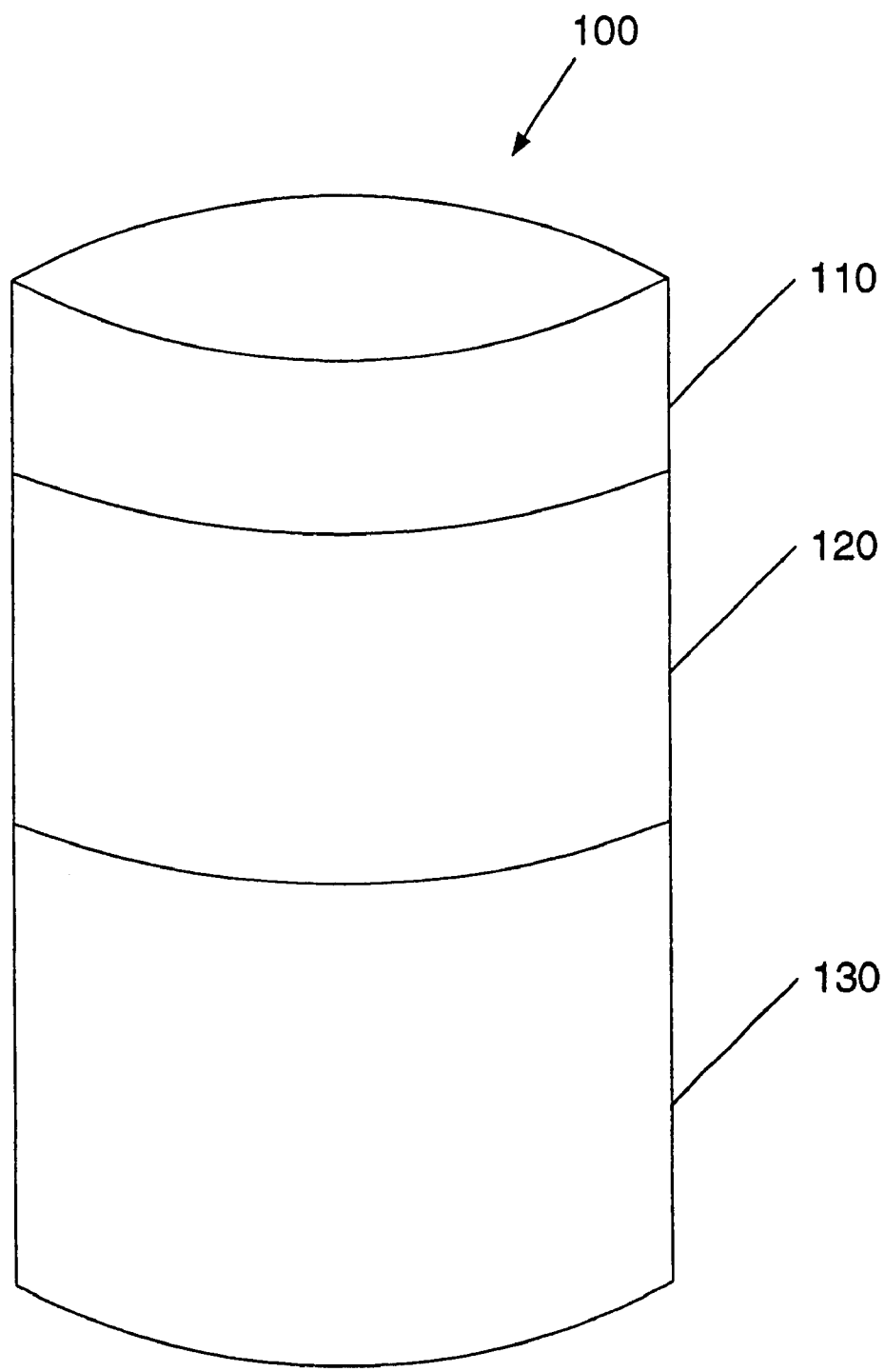
FIG. 1 shows an exemplary functional layout of a disk configured with a hierarchical architecture.

FIG. 1 shows an exemplary functional layout of a disk configured with a hierarchical architecture. In this exemplary functional layout, storage device 100 includes three hierarchical levels-cache level 110, cache level 120, and storage level 130. In general, cache level 110 is a memory-based cache for storing write requests from a sender to storage device 100. For example, cache level 110 may be configured as a group of random-access fixed-sized storage areas, referred to as pages. In addition, cache level 110 may be a write-back cache. In other words, user data written to cache level 110 may not also be written, at the same time, to, for example, cache level 120 or storage level 130.

Cache level 120 is a disk-based cache. In particular, cache level 120 is one of the "back stores" for cache level 110. In other words, as a result of particular operations of storage device 100, a system will, among other things, copy user data from cache level 110 to cache level 120. This process, referred to as flushing, is discussed below in more detail. Typically, the storage capacity of cache level 120 is larger than the storage capacity of cache level 110. In addition, the storage capacity of cache level 120 varies, among other things, in relation to the storage capacity of storage device 100. For example, the storage capacity of cache level 120 may be 10% of the storage capacity of storage device 100. More particularly, cache level 120 is configured as a log structure. As discussed above, in a log structure, a processor writes user data in a sequential nature, rather than in a random nature.

Storage level 130 is a disk-based storage level. In particular, storage level 130 is the other back store for cache level 110 and the back store for cache level 120. Typically, as with cache level 110, storage level 130 is configured as a group of random-access fixed sized storage areas, referred to as sectors.

In a further embodiment of the disk shown in FIG. 1, the disk may be partitioned into logical units. In this embodiment, each logical unit may elect to be log-enabled. A logical unit that elects to be log-enabled is configured with the hierarchical architecture described and claimed herein. A logical unit that elects not to be log-enabled is configured with a more conventional architecture, for example, a random-access architecture.

Figure 2:
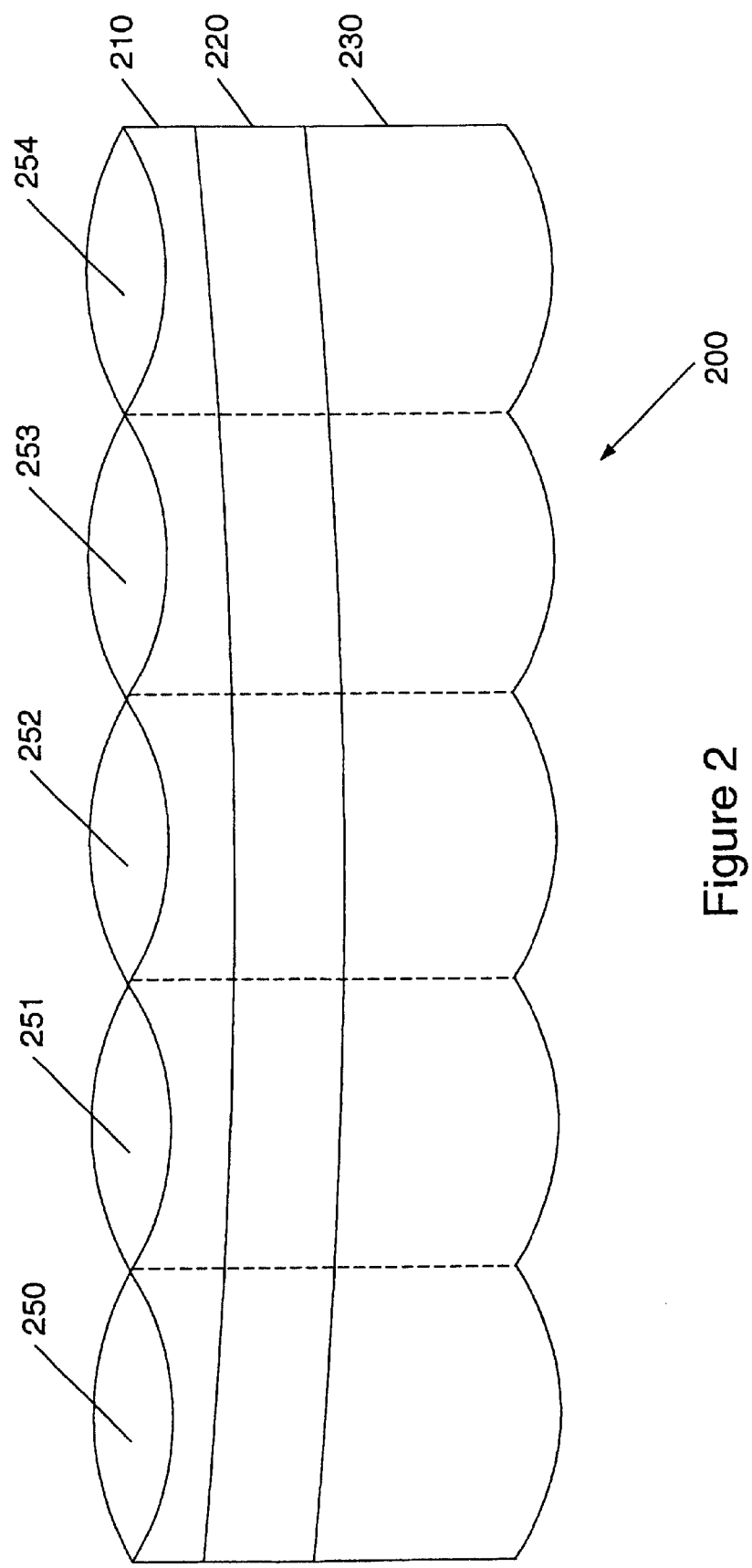
FIG. 2 shows an exemplary functional layout of a disk array configured with a hierarchical architecture.

FIG. 2 shows an exemplary functional layout of a disk array configured with a hierarchical architecture. In this exemplary functional layout, storage device 200 includes disk 250, disk 251, disk 252, disk 253, and disk 254. Similar to storage device 100, storage device 200 includes three levels-cache level 210, cache level 220, and storage level 230. Cache level 210, cache level 220, and storage level 230 operate in a manner similar to cache level 110, cache level 120, and storage level 130. For example, cache level 210 is a memory-based cache for storing write requests from a sender to storage device 200. In addition, cache level 220 is configured as a log structure and is one of the back stores for cache level 210. Further, storage level 230 is the other back store for cache level 210 and the back store for cache level 220.

In a further embodiment of the disk array shown in FIG. 2, storage level 230 may be configured as a Redundant Array of Independent Disks ("RAID"). For example, storage level 230 may be configured as a RAID Level 5. The various RAID levels are discussed in more detail in the article "A Case for Redundant Arrays of Inexpensive Disks (RAID)," ACS SIGMOD Conference, Chicago, Ill. Jun. 1–3, 1988, by David A. Patterson, Garth A. Gibson, and Randy H. Katz.

In a still further embodiment of the disk array shown in FIG. 2, storage level 230 may be partitioned into logical units. For example, storage device 230 may be partitioned into logical unit A, logical unit B, and logical unit C. A method for partitioning storage level 230 into logical units is discussed in U.S. Pat. No. 5,568,629, issued Oct. 22, 1996, and titled "METHOD FOR PARTITIONING DISK DRIVE WITHIN A PHYSICAL DISK ARRAY AND SELECTIVELY ASSIGNING DRIVE PARTITIONS INTO A LOGICAL DISK ARRAY," the disclosure of which is incorporated herein, in its entirety, by reference. In this embodiment, as discussed above in regard to the disk shown in FIG. 1, each logical unit may elect to be log-enabled. A logical unit that elects to be log-enabled is configured with the hierarchical architecture described and claimed herein. A logical unit that elects not to be log-enabled is configured with a more conventional architecture, for example, a RAID Level.

In a yet still further embodiment of the disk array shown in FIG. 2, storage device 200 includes more than one disk group. A disk group is a virtual disk into which, for example, a database management system stores user data. A disk group can be a single disk partition on a single physical disk, multiple disk partitions on a single physical disk, or multiple disk partitions across more than one physical disk. In this embodiment, each disk group may be assigned a different disk-based cache. For example, in a disk array configured with three groups, group A through group C, group A may be configured with the hierarchical architecture described and claimed herein, group B may be configured with the hierarchical architecture described and claimed herein, and group C may be configured with a more conventional architecture, for example, a RAID Level. Thus, group A may include cache level A(1), cache level A(2), and storage level A(3). On the other hand, group B may include cache level A(1), cache level B(2), and storage level B(3).

Figure 3A:
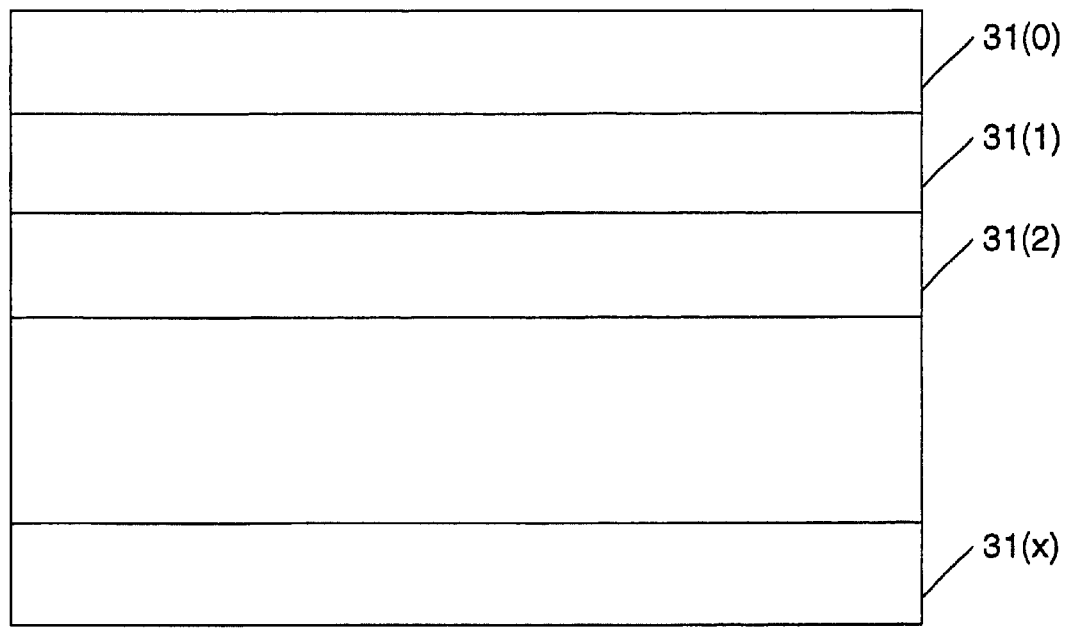
FIGS. 3a through 3c show an exemplary functional layout of a log structure.
Figure 3B:
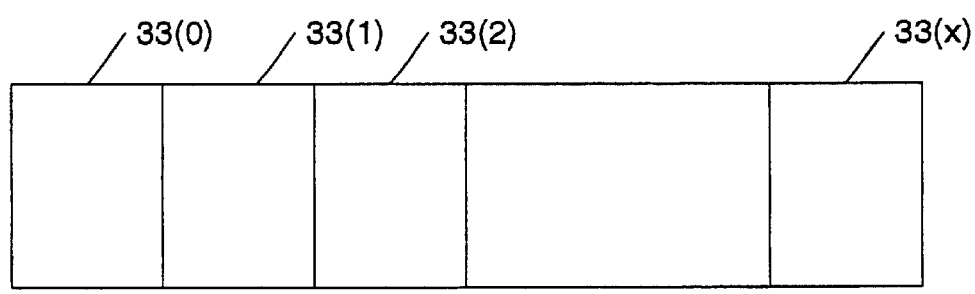
Figure 3C:
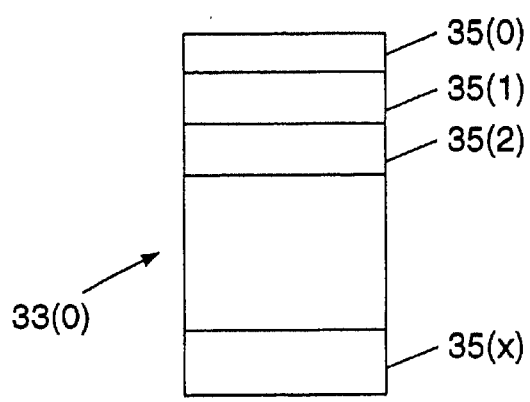

FIGS. 3a through 3c show an exemplary functional layout of a log structure. In this exemplary functional layout, as shown in FIG. 3a, log structure 300 is divided into segments-segment 31(0), segment 31(1), segment 31(2) through segment 31(x). As shown in FIG. 3b, a segment, such as segment 31(0), is divided into segment elements-segment element 33(0), segment element 33(1), segment element 33(2) through segment element 33(x). As shown in FIG. 3c, a segment element, such as segment element 33(0), is divided into blocks-block 35(0), block 35(1), block 35(2) through block 35(x).

Typically, when the hierarchical architecture described and claimed herein is used in a single disk, the width of a segment approximates the width of the disk and the width of a segment element also approximates the width of the disk. Thus, in this configuration, a segment may include a single segment element. However, when the hierarchical architecture described and claimed herein is used in a disk array, the width of a segment approximates the width of a disk array and the width of a segment element approximates the width of a disk. Thus, in this configuration, a segment may include segment elements equal to the number of disks in the disk array. For example, in a 5-disk array, a segment may include 5 segment elements. A person of skill in the art understands that the width of segment and the width of a segment element may be modified to meet the needs of a particular computer implementation.

The height of a segment, and in turn a segment element, is dependent upon, among other things, the size and number of blocks in the segment element. Typically, the size of a block is similar to the size of a sector on a disk, e.g., 512 bytes or, for some configurations, 520 bytes. Typically, the number of blocks per segment element is dependent upon the storage capacity of a segment element for user data. For example, if the storage capacity of a segment element for user data is approximately 64 kilobytes (which is approximately the average storage capacity of a track on a disk) and the size of a block is 512 bytes, then the number of blocks per segment element is approximately 128 blocks. As person of skill in the art understands that the size and number of blocks per segment element may be modified to meet the needs of a particular computer implementation.

The number of segments per log structure varies in accordance with, among other things, the storage capacity of the log structure and the storage capacity of a segment element. For example, in a 3-disk array, if the storage capacity of a log structure is approximately 3.1 megabytes and the storage capacity of a segment element is approximately 64 kilobytes, then the number of segments per log structure is approximately 16 segments. As discussed above, the storage capacity of the log structure varies, among other things, in relation to the storage capacity of the storage device configured with the hierarchical architecture described and claimed herein. For example, in a disk array, the storage capacity of the log structure may be 10% of the storage capacity of the disk array.

Typically, there are two types of segments in a log structure, segments which contain "live" data and segments which do not contain "live" data. As discussed above, because a system writes user data to a log structure in a sequential nature, modified user data is not written over the previously stored used data. Thus, modified user data is written in a different location than the previously stored data. When this occurs, the previously stored data changes state-from live data to dead data. Thus, a segment may contain live data, dead data, or a combination of live data and dead data. A segment which contains live data is referred to as a used segment.

In contrast, a segment which does not contain live data is referred to as a free segment. A free segment is available for use in the log structure. In general, free segments are stored in a free segment list. A free segment list may be assigned to, for example, a disk, a disk array, or a logical unit. Thus, for example, each logical unit may be assigned its "own" free segment list. In addition, free segment lists may be assigned on a hierarchical basis. For example, free segments for use in a log-enabled logical unit might first be found in a free segment list for the logical unit, and then in a free segment list for the disk array containing the logical unit.

In addition, in a disk array with more than one system, free segment lists may be assigned to a particular system. For example, free segments for use in a log-enabled logical unit might first be found in a free segment list for the logical unit, and then in a free segment list for the logical units' system. When, for example, no free segments remain on either the free segment list for the logical unit or the free segment list for the logical unit's system, the logical unit's system may request free segments from the other system in the disk array. The allocation of free segment lists between systems is discussed below in more detail.

A system tracks information about the segments in a log structure with a segment database and a segment summary. The segment database describes, among other things, the user data layout of the segment. In other words, the segment data contains the physical-to-logical address translation for the user data in the segment. For example, the segment database may include the logical unit number the segment is assigned to, as well as the width of the disk array the segment is assigned to. Typically, the segment database is stored in the first 2 blocks of each segment element in a segment.

The segment summary is used for the runtime management of the segments. Typically, the segment summary describes, among other things, a segment summary array composed of indices for each segment. For example, the segment summary for each segment in a log structure may include the segment's index value in the array, as well as the number of live data blocks in the segment. A bit map may complement the segment summary for each segment. In general, the bit map indicates which particular blocks in the segment contain live data.

A system tracks information about the user data in a segment with a logical-to-physical map. The logical-to-physical map includes, among other things, map elements. Each map element describes, among other things, the starting block address for user data, the number of contiguous blocks for the user data, the segment containing the user data, and the offset to the block in the segment. Using this structure, the logical-to-physical map can keep track of contiguous user data that has been split, truncated, or overwritten.

Figure 4A:
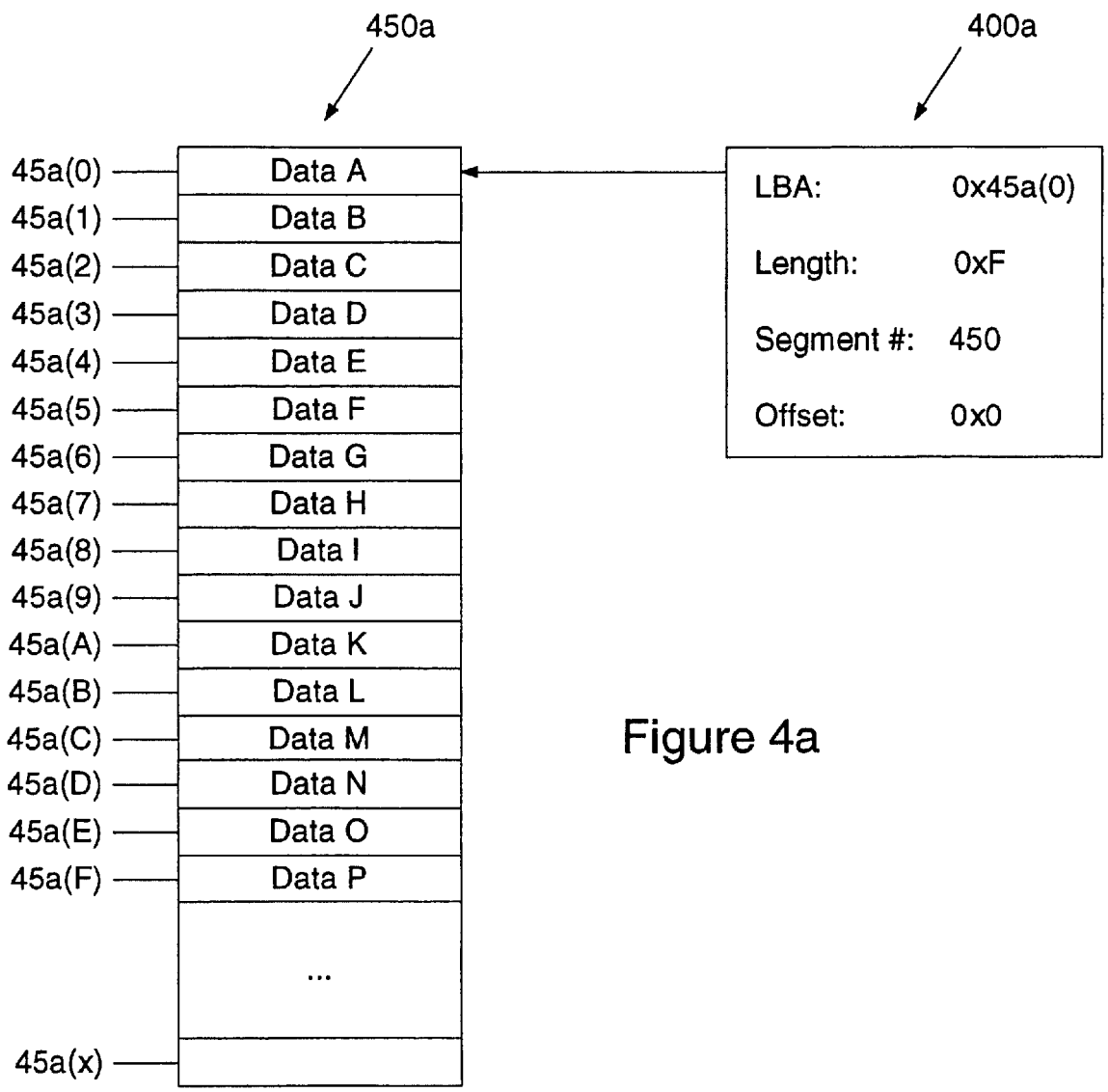
FIGS. 4a and 4b show exemplary functional layouts of a logical-to-physical map for a log structure.
Figure 4B:
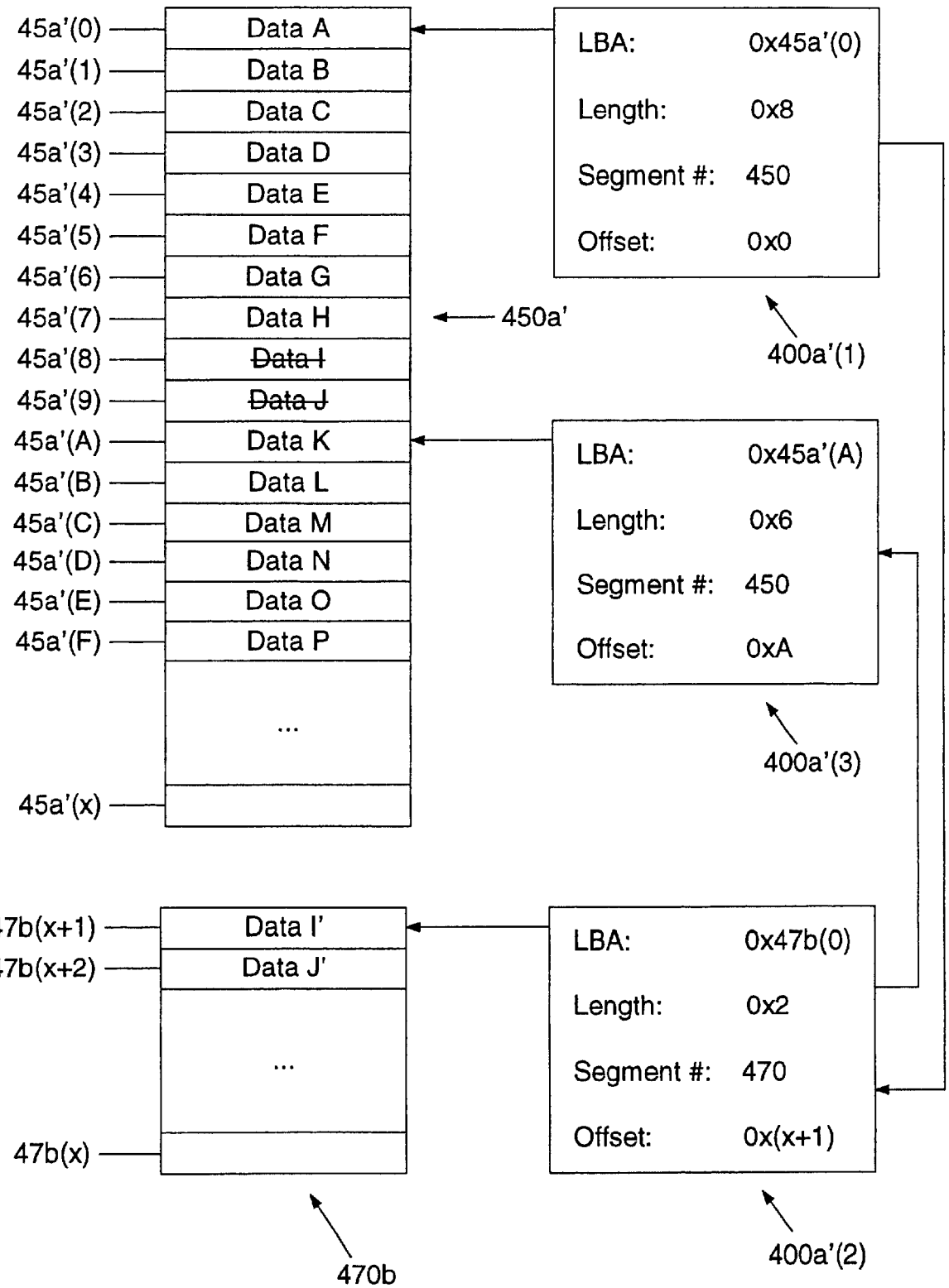

FIGS. 4a and 4b show exemplary functional layouts of a logical-to-physical map for a 25 log structure. In the first exemplary functional layout, as shown in FIG. 4a, map element 400a describes a 16-block long section of contiguous user data located in segment element 450a. Segment element 450a is the first segment element in segment 450 (not shown), which, for example, spans 5 disks in a 5-disk array. For purposes of illustration, and subsequent to the writing of the 16-block long section of contiguous user data, the user data in block 45a(8) and block 45a(9) is modified. As shown in FIG. 4b, the modified data is written to a new segment element, segment element 470b. Segment element 470b is the second segment element in segment 470 (not shown), which spans the same 5 disks as segment 450.

As a result of the writing of the modified data, the logical-to-physical map must be updated to reflect the location of the modified data, and the state of the previously stored data must be changed from live data to dead data. The modified logical-to-physical map, shown in FIG. 4b, now contains three map elements, map element 400a'(1), map element 400a'(2), and map element 400a'(3). Map element 400a'(1) describes the first 8 blocks of the user data, located in block 45a'(0) through block 45a'(7) in segment element 450a'. Similar to segment element 450, segment element 450a' is the first segment element in segment 450. Map element 400a'(2) describes the next 2 blocks of the user data, located in block 47b(x+1) and 47b(x+2) in segment element 470b. Map element 400a'(3) describes the last 6 blocks of the user data, located in block 45a'(A) through block 45a' (F). (NOTE: In this example, the blocks are numbered using hexadecimal numbering, a base-16 numbering system.)

Figure 5A:
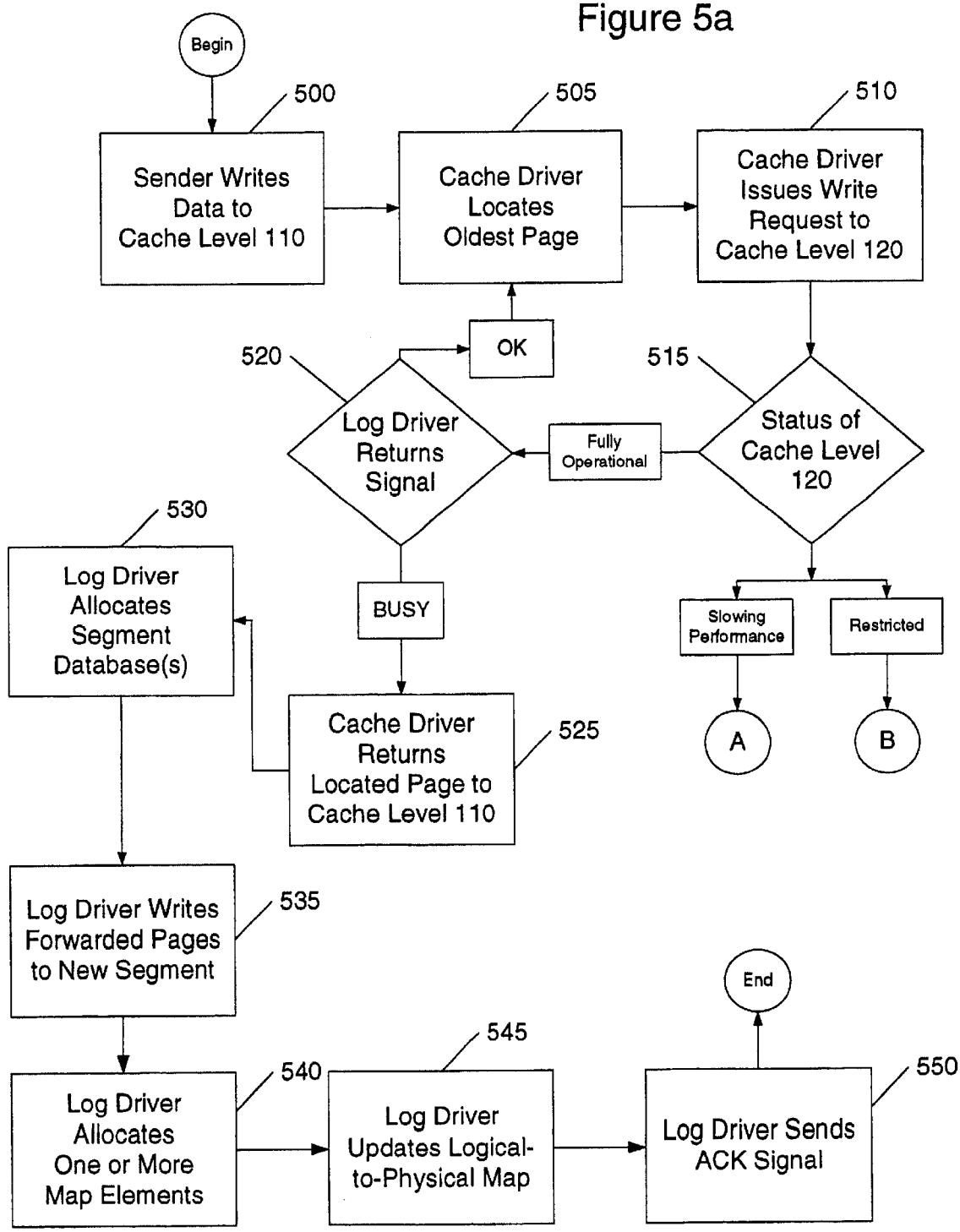
FIGS. 5a through 5c show an exemplary process for writing data to a disk configured with a hierarchical architecture, such as the storage device shown in FIG. 1.
Figure 5B:
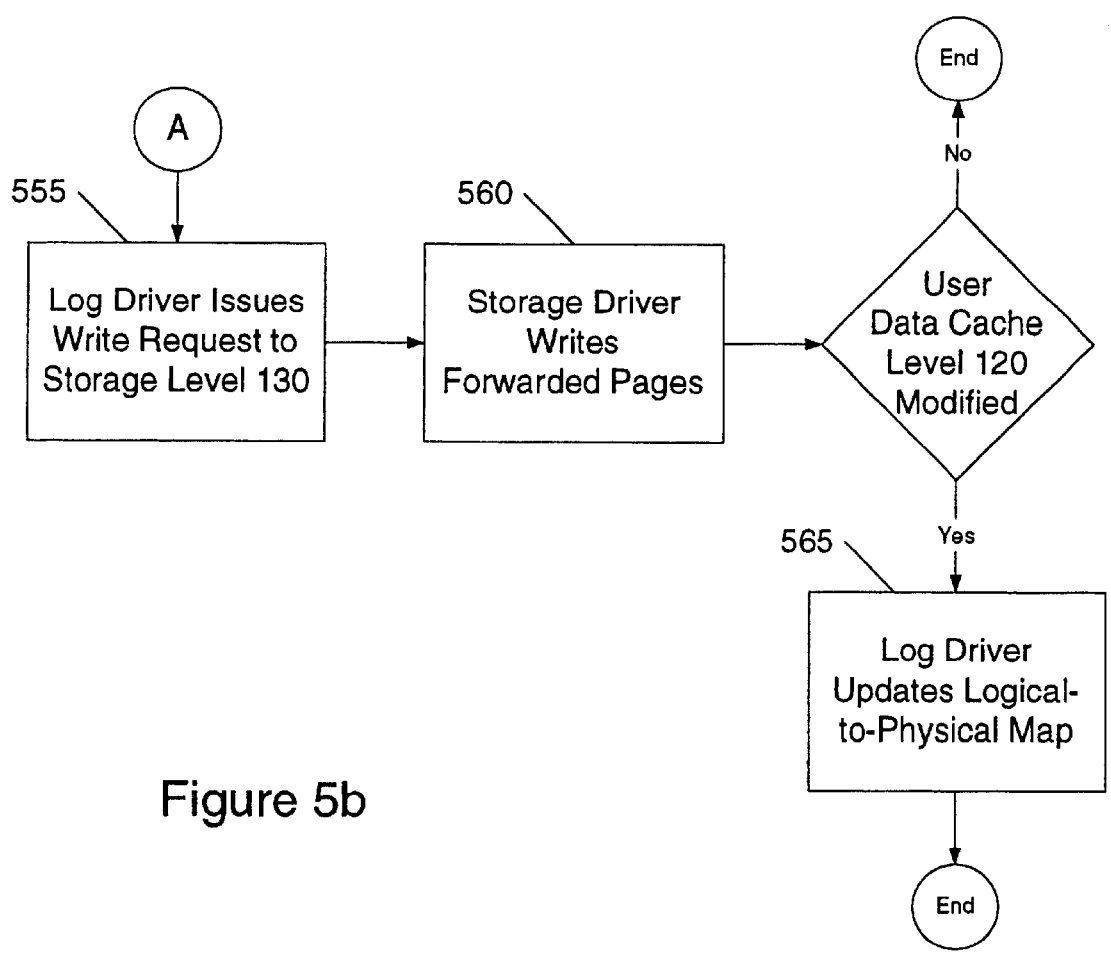
Figure 5C:
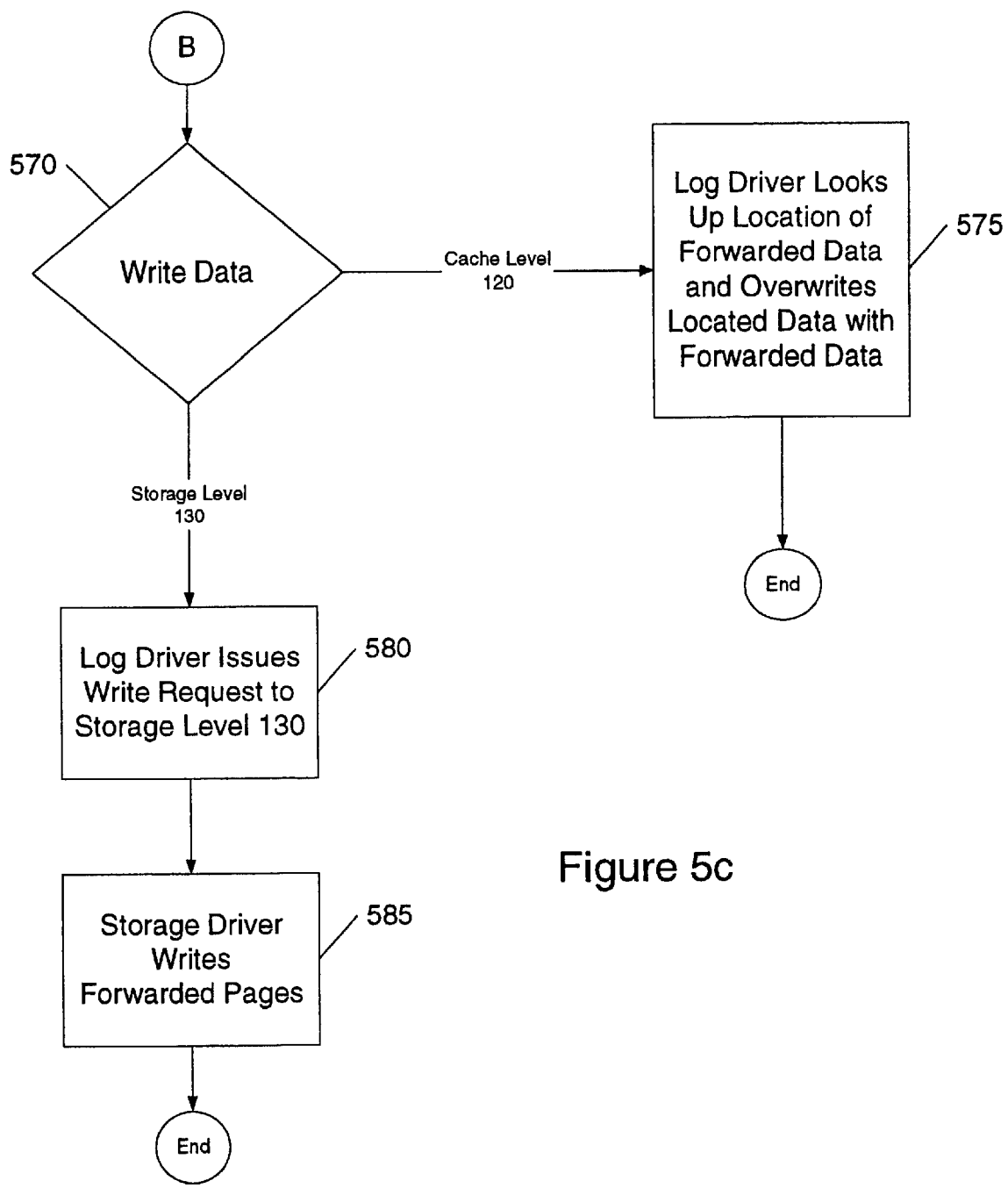

FIGS. 5a through 5c show an exemplary process for writing data to a disk configured with a hierarchical architecture, such as storage device 100 shown in FIG. 1. In particular, FIG. 5a shows an exemplary process for writing data when cache level 120 is fully operational. The process begins at step 500, in which a sender writes data to cache level 110. Then, at step 505, the driver for cache level 110, referred to as the cache driver, locates the oldest "page" in cache level 110. As discussed above, a page is a random-access fixed-sized storage area. Thus, in this step, the cache driver locates the oldest user data in cache level 110. Next, at step 510, the cache driver issues a write request to cache level 120.

Typically, the located pages are "locked" until the driver for cache level 120, referred to as a log driver, returns an ACKNOWLEDGE to the cache driver (discussed below). The system will not write new user data, or modified user data, to a locked page. In addition, scatter gather lists may be built prior to the cache driver's issuance of the write request to the log driver.

The process continues at step 515, in which the log driver determines the status of cache level 120. For example, cache level 120 may be slowing the performance of the system (shown in FIG. 5b) or access to cache level 120 may be restricted (shown in FIG. 5c). When, however, cache level 120 is fully operational, then, at step 520, the log driver returns a signal to the cache driver. If the log driver returns an OK signal, then the cache driver repeats step 505 and step 510. If, however, the log driver returns a BUSY signal, then, at step 525, the cache driver returns the located page to cache level 110. The return of a BUSY signal indicates that the log driver has received enough user data from the cache driver to write a full segment.

At step 530, the log driver allocates a segment database for each of the segment elements in the segment. At step 535, the log driver writes the forwarded data to a new segment. If storage device 100 utilizes parity, the log driver will also allocate a parity buffer (not shown), generate parity for the user data (not shown), and write the parity data at the same time the log driver writes the forwarded data to the new segment (not shown). Next, at step 540, the log driver allocates one or more map elements for the new segment. At step 545, the log driver updates the logical-to-physical map to, among other things, reflect the new segment.

The logical-to-physical map must also be updated when previously stored user data has been modified with new user data. In this circumstance, four possible conditions may result. In the first condition, all the user data in a segment has been modified. In this condition, the map element for the segment is placed, for example, on a free map element list. Then, the segment summary for the segment is updated to reflect, among other things, that the segment contains all dead data. In addition, because the segment now contains all dead data, the segment may be returned to, for example, a free segment list.

In the second condition, user data at the beginning of a segment has been modified. In the third condition, user data at the end of a segment has been modified. In both of these conditions, the map element is updated to reflect, among other things, that the map element points to less user data. Then, the segment summary for the segment is updated to reflect, among other things, that the segment contains less live data.

In the fourth condition, user data in the segment has been "split" because user data between the beginning and the end of the segment has been modified. In this condition, the map element is updated to reflect, among other things, that the map element points to the "beginning portion" of the segment. Then, a new map element is allocated for the "end portion" of the segment. When user data in the segment has been "split" in numerous places, then more than one new map element needs to be allocated for the numerous "middle portions" of the segment. Last, the segment summary for the segment is updated to reflect, among other things, that the segment contains less live data.

The process continues at step 550, in which the log driver sends an ACKNOWLEDGE signal to the cache driver. The ACKNOWLEDGE signal informs the cache driver that the log driver is ready to receive new more data. In addition, the ACKNOWLEDGE signal informs the cache driver that the cache driver can now invalidate the forwarded pages. If scatter gather lists were built, then the ACKNOWLEDGE signal also informs the cache driver that the cache driver can now invalidate the scatter gather lists.

FIG. 5b shows an exemplary process for writing data when cache level 120 is slowing the performance of the system. The process begins at step 555, in which the log driver issues a write request to storage level 130. At step 560, the driver for storage level 130, referred to as the storage driver, writes the forwarded data to, for example, a random-access architecture. If the user data written to storage level 130 has modified user data stored in cache level 120, then, at step 565, the log driver updates the logical-to-physical map, as discussed above. The "slow performance" process may also be used when, at step 510, the cache driver's write request spans a full segment. In this circumstance, the process shown in FIG. 5b avoids the extra "staging" of the user data in cache level 120.

FIG. 5c shows an exemplary process for writing data when access to cache level 120 is restricted because, for example, cache level 120 is disabled or the logical-to-physical map is unavailable. The logical-to-physical map may be unavailable because of a power failure. In this circumstance, the logical-to-physical map has, most likely, been saved to a "vault" disk. Power failure recovery is discussed below in more detail.

The process begins at step 570, in which the log driver determines whether the forwarded data should be written to cache level 120 or storage level 130. The forwarded data should be written to cache level 120 when the forwarded data is modified data for data that has been previously stored in cache level 120. Otherwise, the forwarded data is written to storage level 130. If the forwarded data should be written to cache level 12, then, at step 575, the log driver looks up the location of the forwarded data in cache level 120 and overwrites, in place, the located data with the forwarded data. If not, then, at step 580, the log driver issues a write request to storage level 130. At step 585, the storage driver writes the forwarded data to, for example, a random-access architecture.

In a further embodiment of the processes shown in FIGS. 5a through 5c, the cache driver, the log driver, and the storage driver may be implemented as virtual drivers, as described in U.S. patent application Ser. No. 09/614,646.

Figure 6A:
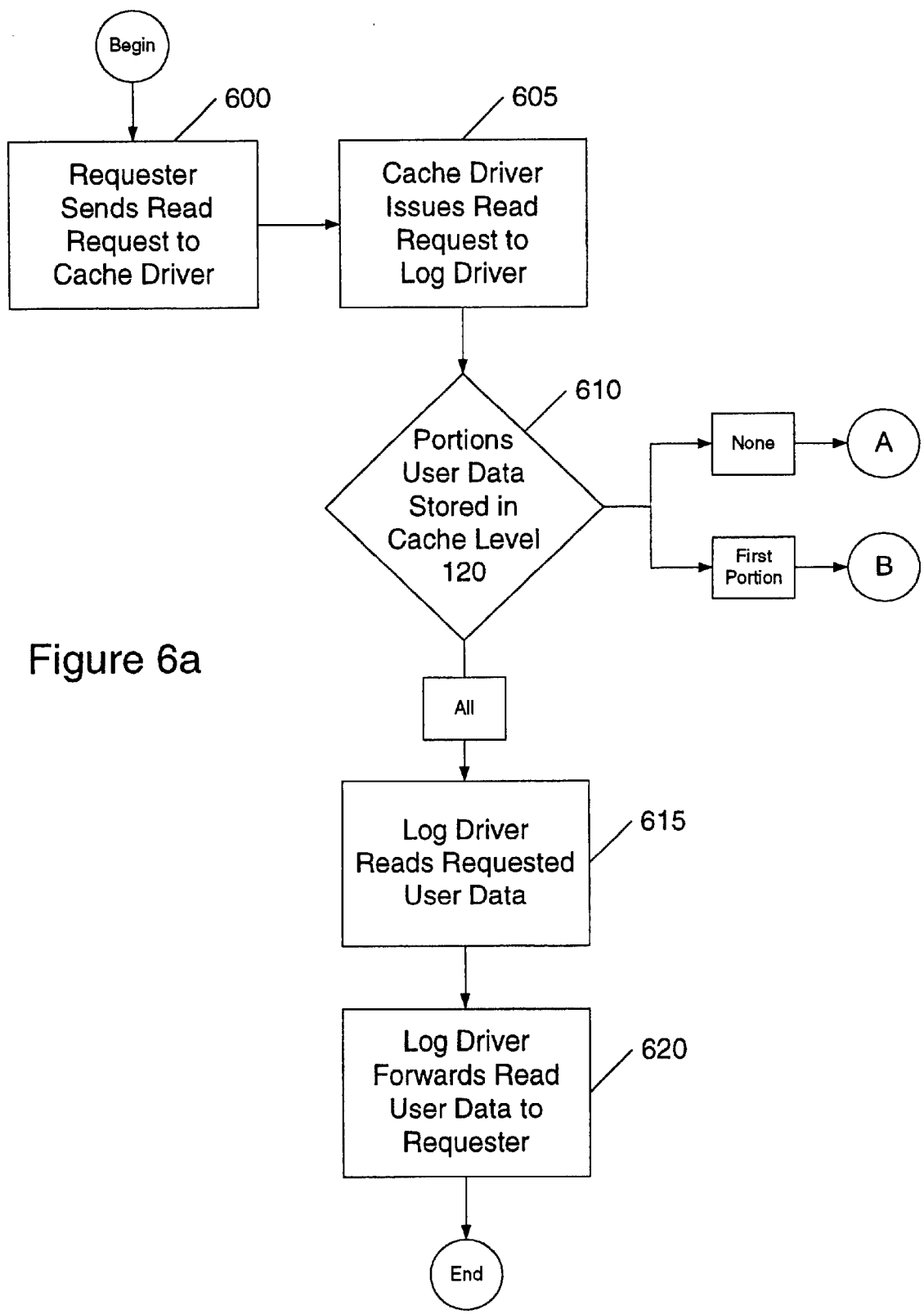
FIGS. 6a through 6c show an exemplary process for reading data to a disk configured with a hierarchical architecture, such as the storage device shown in FIG. 1.
Figure 6B:
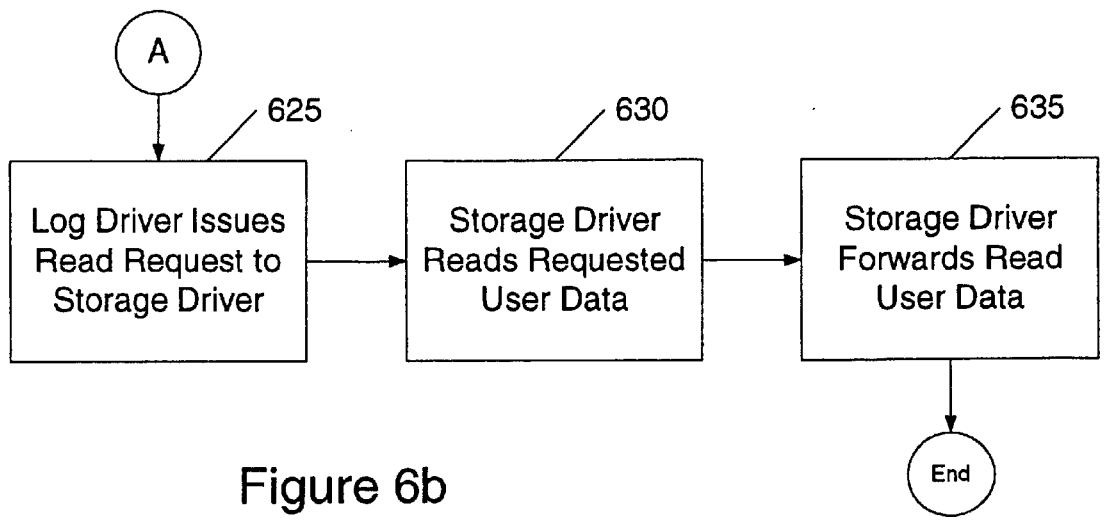
Figure 6C:
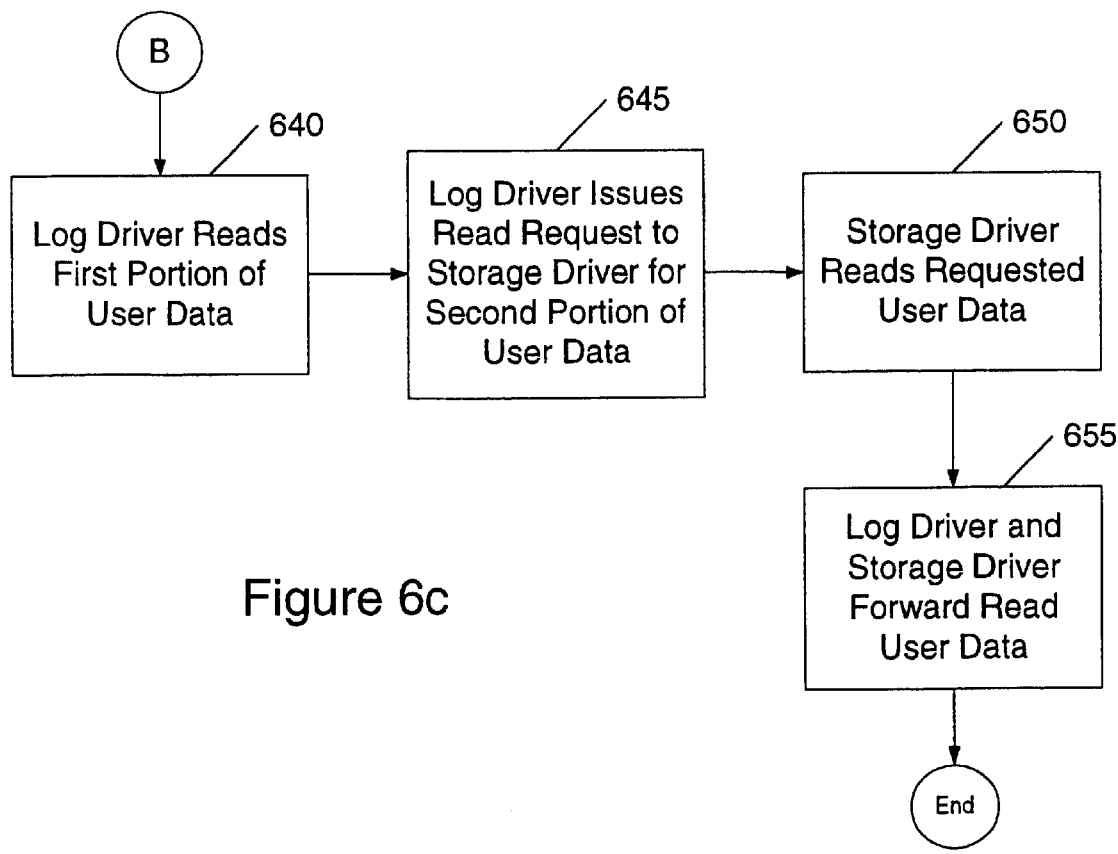

FIGS. 6a through 6c show an exemplary process for reading data to a disk configured with a hierarchical architecture, such as storage device 100 shown in FIG. 1. In particular, FIG. 6a shows an exemplary process for reading data when the data is located in cache level 120. The process begins at step 600, in which a requester sends a read request to the cache driver. At step 605, having determined that the user data does not reside in cache level 110, the cache driver issues a read request to the log driver. The read request includes, among other things, the logical unit number in which the user data is stored, the starting block address in which the user data is stored, and the number of contiguous blocks in which the user data is stored. Next, at step 610, the log driver determines which, if any, portions of the user data is stored in cache level 120. If all of the user data is stored in cache level 120, then, at step 615, the log driver reads the requested user data. At step 620, the log driver forwards the read user data to the requester.

The read request to the log driver may also include a Direct Memory Access ("DMA") flag. The DMA flag informs the log driver of, among other things, where to forward the read user data. In addition, the read request to the log driver may also include a scatter gather element. Typically, the scatter gather element informs the log driver whether to allocate buffer space.

FIG. 6b shows an exemplary process for reading data when the data is located in storage level 130. In this exemplary process, the log driver has determined (at step 610) that none of the user data is stored in cache level 120. Thus, the process begins at step 625, in which the log driver issues a read request to the storage driver. The read request includes, among other things, the starting block address in which the user data is stored and the number of contiguous blocks in which the user data is stored. At step 630, the storage driver reads the requested user data. Then, at step 635, the storage driver forwards the read user data to, for example, the requester. The read request to the storage driver may also include a scatter gather element. Typically, the scatter gather element informs the storage driver where to transfer the read user data.

FIG. 6c shows an exemplary process for reading data when the data is located in cache level 120 and storage level 130. In this exemplary process, the log driver has determined (at step 610) that, for example, the "first portion" of the user data is stored in cache level 120. Thus, the process begins at step 640, in which the log driver reads the first portion of the user data stored in cache level 120. Then, at step 645, the log driver issues a read request to the storage driver for the second portion of the user data stored in storage level 130. At step 650, the storage driver reads the requested user data stored in storage level 130. At step 655, the log driver and the storage driver forward the read user data to, for example, the requester.

Figure 7:
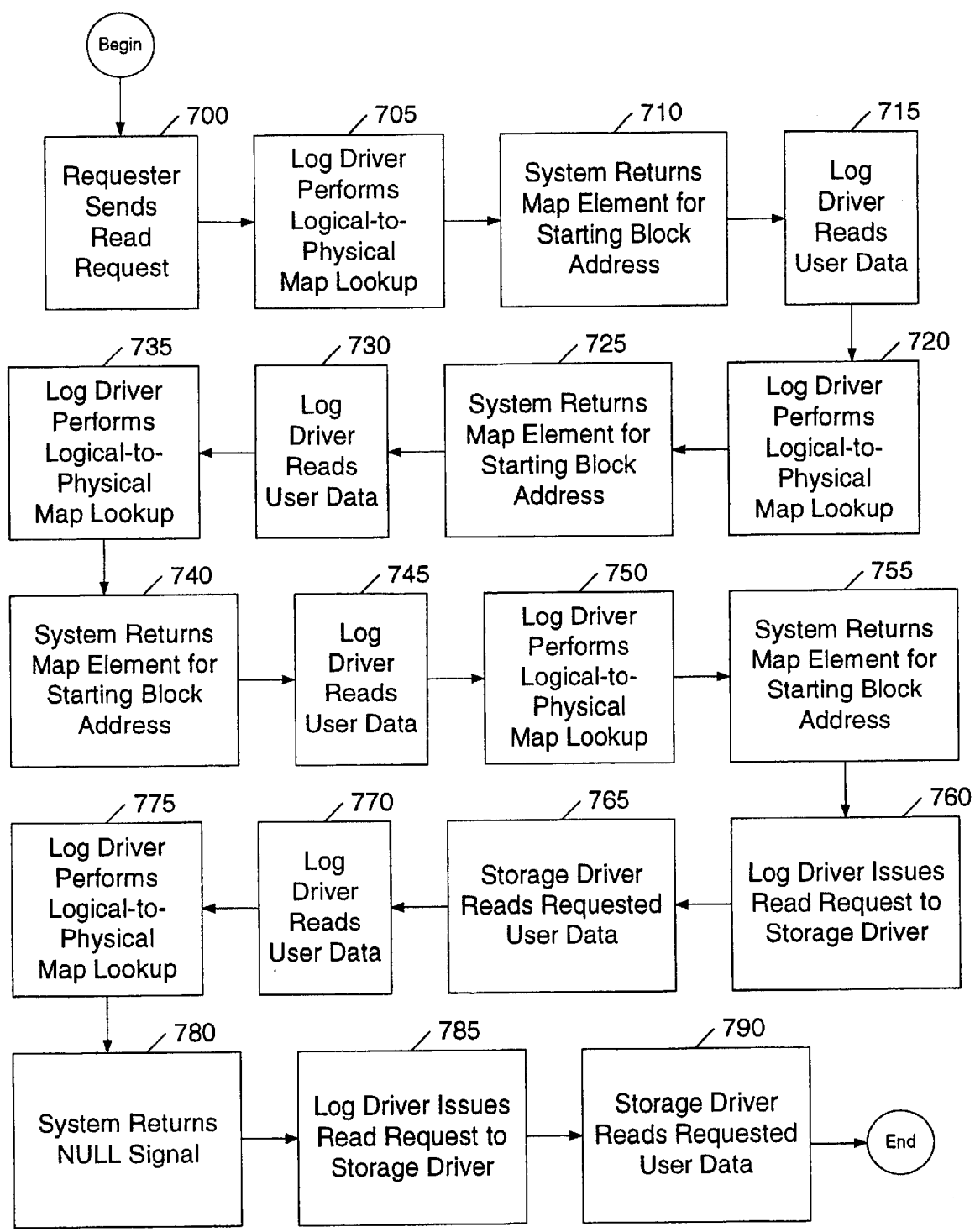
FIG. 7 shows an exemplary process for determining whether user data is stored in a log structure located on a storage device, such as the storage device shown in FIG. 1.

FIG. 7 shows an exemplary process for determining whether user data is stored in a log structure located on a storage device, such as storage device 100 shown in FIG. 1. The process begins at step 700, in which a requester sends a read request for, for example, 36 blocks of user data located on storage device 100 as follows:

| Cache Level 120 | Storage Level 130 | Cache Level 120 | Storage Level 130 | |
|---|---|---|---|---|
| 1024 | 1036 | 1039 | 1047 | 1059 |

As shown, the starting block address of the user data is 1024 and the ending block address of the user data is 1059. The first 12 blocks of user data are located in cache level 120, the next 3 blocks of user data is located in storage level 130, the next 8 blocks of user data is located on cache level 120, and the last 13 blocks of user data is located on storage level 130.

The process continues at step 705, in which the log driver performs a logical-to-physical map lookup for the user data. Next, at step 710, the system returns the map element for starting block address 1024. The map element shows the following:

| | |
|---|---|
| LBA: | 1024 |
| Length: | 4 |
| Segment #: | 1 |
| Offset: | 0 |

The process continues at step 715, in which the log driver reads the user data in the first 4 blocks of segment 1-block 1024 through block 1027. Then, at step 720, the log driver performs a logical-to-physical map lookup for the next 32 blocks of user data. At step 725, the system returns the map element for starting block address 1028, the next contiguous block address for the user data. The map element shows the following:

| | |
|---|---|
| LBA: | 1028 |
| Length: | 2 |
| Segment #: | 2 |
| Offset: | 5 |

The process continues at step 730, in which the log driver reads the user data in the sixth and seventh blocks of segment 2-block 1028 and block 1029. Then, at step 735, the log driver performs a logical-to-physical map lookup for the next 30 blocks of user data. At step 740, the system returns the map element for starting block address 1030, the next contiguous block address for the user data. The map element shows the following:

| | |
|---|---|
| LBA: | 1030 |
| Length: | 6 |
| Segment #: | 4 |
| Offset: | 2 |

The process continues at step 745, in which the log driver reads the user data in the third through eighth blocks of segment 4-block 1030 through block 1035. Then, at step 750, the log driver performs a logical-to-physical map lookup for the next 24 blocks of user data. At step 755, the system returns the map element for starting block address 1036, the next contiguous block address for the user data. The map element shows the following:

| | |
|---|---|
| LBA: | 1039 |
| Length: | 8 |
| Segment #: | 5 |
| Offset: | 0 |

The process continues at step 760, in which the log driver issues a read request to the storage driver. In this example, the log driver issues a read request to the storage driver because the system returned the map element for block address 1039, rather than block address 1036. Thus, 3 blocks of user data, block 1036 through block 1038, are not located in cache level 120. At step 765, the storage driver reads the requested 3 blocks of user data.

Then, at step 770, the log driver reads the user data in the first through eighth blocks of segment 5-block 1039 through block 1046. Next, at step 775, the log driver performs a logical-to-physical map lookup for the next 13 blocks of user data. At step 780, the system, attempting to return the map element for starting block address 1047, the next contiguous block address for the user data, returns a NULL signal to the log driver. In this example, the system returns a NULL signal to the log driver because the remaining 13 blocks of user data are not located in cache level 120. Thus, at step 785, the log driver issues a read request to the storage driver. At step 790, the storage driver reads the requested 13 blocks of user data.

B. Cleaning the Log Structure

Figure 8:
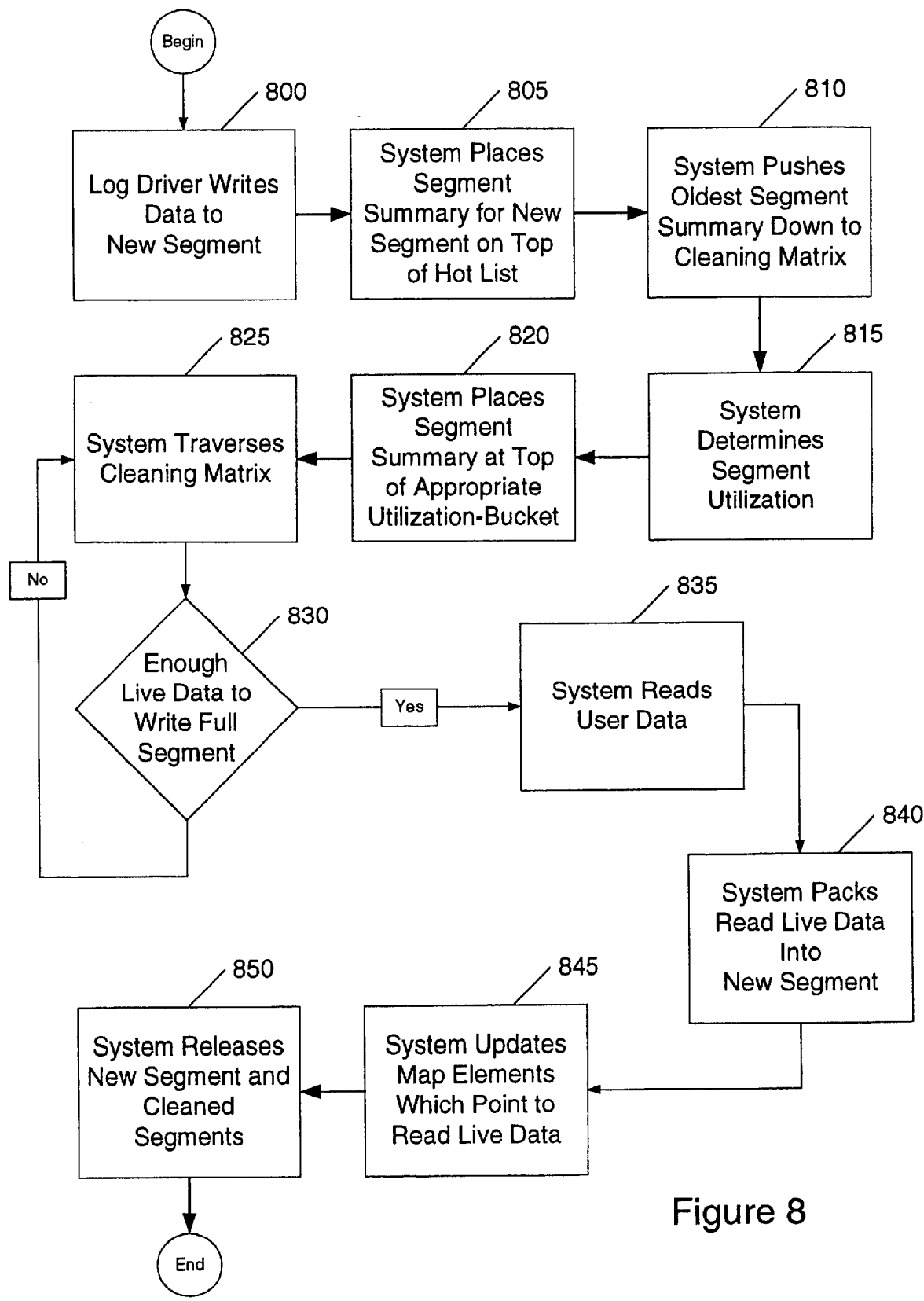
FIG. 8 shows an exemplary process for cleaning a log structure located on a storage device, such as the storage device shown in FIG. 1.

FIG. 8 shows an exemplary process for "cleaning" a log structure located on a storage device, such as storage device 100 shown in FIG. 1. The process of cleaning a log structure includes, among other things, packing fragmented segments. A fragmented segment is a segment that contains both live data and dead data. As a result of the cleaning process, used segments become free segments. The free segments may be placed on a free segment list.

The process begins at step 800, in which the log driver writes data to a new segment. Then, at step 805, the system places the segment summary for the new segment on the top of a hot list. In placing each new segment summary at the top of the hot list, a most-recently-used list is created, with the "youngest" segment summary at the top of the hot list and the "oldest" segment summary at the bottom of the hot list. Thus, at all times, the system knows which segments are the "hottest" the segments with segment summaries at the top of the hot list) and which segments are the "coolest" (the segments with segment summaries at the bottom of the hot list).

This process continues at step 810, in which the system pushes the oldest segment summary on the hot list "down" to a cleaning matrix. In general, the cleaning matrix groups the segment summaries into age-ordered utilization-buckets. Typically, the oldest segment summary is pushed down to the cleaning matrix when the oldest segment summary crosses a predetermined point in the hot list. The predetermined point in the hot list varies in accordance with, among other things, the operation of storage device 100.

For example, if storage device 100 is "overwriting" a large portion of cache level 120, then the predetermined point in the hot list is further down the hot list. If, however, storage device 100 is "overwriting" a small portion of cache level 120, then the predetermined point in the hot list is further up the hot list. In adjusting the predetermined point in the hot list, the cleaning process avoids cleaning segments that are in flux and, thereby, performing potentially unnecessary work. The unnecessary work is avoided because, for example, a segment in flux is a segment in which previously stored data is changing state-from live data to dead data. When a segment contains all dead data, the segment "self-cleans." In other words, the system places the self-cleaned segment back on, for example, a free segment list, without the need to execute the cleaning process.

In a further embodiment of the invention, the system may push more than one segment summary down to the cleaning matrix. The number of segment summaries pushed down varies in proportion to, among other things, the number of segments allocated for cache level 120. In addition, similar to the predetermined point in the hot list, the number of segment summaries pushed down varies in accordance with, among other things, the operation of storage device 100.

As discussed below, the segments described in the pushed-down segment summaries are the segments the system is permitted to clean. Thus, in separating the segments into a most-recently-used hot list and a most-recently-used cleaning matrix, the system avoids cleaning the youngest, in other words, hottest, segments. The hottest segments tend to self-clean. In contrast, the less hot segments, referred to as warm segments, tend to be good candidates for cleaning. These warm segments, as well as the coldest segments, are located in the cleaning matrix.

Next, at step 815, the system determines the utilization of the segment described in the pushed-down segment summary. Segment utilization is:

$$\frac{\text{\# Live Data Blocks}}{\text{Total Blocks}}$$

Accordingly, segment utilization ranges from 0.0 (all dead data) to 1.0 (all live data). Segment utilization may also be expressed as a percentage. Thus, a segment may be 0% live to 100% live.

Then, at step 820, the system places the segment summary at the top of the appropriate utilization-bucket. In a process similar to the hot list, in placing each pushed-down segment summary at the top of the appropriate utilization-bucket, a most-recently-used list is created, with the "youngest" pushed-down segment summary at the top of the utilization-buckets and the "oldest" pushed-down segment summary at the bottom of the utilization-buckets. Thus, at all times, the system knows which segments in a utilization-bucket are the "hottest" (the segments with segment summaries at the top of the utilization-bucket) and which segments are the "coolest" (the segments with segment summaries at the bottom of the utilization-bucket).

At step 825, the system traverses the cleaning matrix, looking for the best segments, as described in the segment summaries, to clean. In general, the best segment to clean is the segment described in the youngest pushed-down segment summary in the lowest utilization-bucket. Typically, however, the process of looking for the best segment is a less straight-forward process. Rather, the process involves a balancing test-balancing the segment's age against the segment's utilization. The process of looking for the best segment to clean is described below in more detail.

Next, at step 830, the system determines whether, via the information in the segment summaries for the segments to be cleaned, the system has located enough live data blocks to write a full segment. As discussed above, a segment summary for a segment contains, among other things, the number of live blocks in the segment. Thus, as the system traverses the cleaning matrix, the system tracks the number of live data blocks for the "found" segments. When the system has located enough live data to write a full segment, then, at step 835, the system reads the live data in the found segments. Next, at step 840, the system "packs" the read live data into a new segment. In other words, the system writes the read live data into a new segment.

In writing a new segment, the system must, among other things, maintain a list of map elements which point to the live data involved in the cleaning process. Thus, at step 845, the system updates the map elements which point to the read live data. In particular, the system modifies the segment number in which the live data is located and the offset to the block in which the live data is located.

Typically, the found segments are locked until the system updates the map elements which point to the read live data. In addition, scatter gather lists may be used to avoid memory-to-memory copies when, for example, the system reads the user data in the found segment.

The process continues at step 850, in which the system releases the new segment and the cleaned segments. For example, the system places the new segment in the cleaning matrix and the new cleaned segments on, for example, a free segment list. In placing the new segment in the cleaning matrix, the system may place the new segment in the same location in the cleaning matrix in which, for example, the system located the first found segment. Or, the system may place the new segment in the same location in the cleaning matrix in which, for example, the system located the last found segment.

In a further embodiment of the invention, storage device 100 is partitioned into logical units. In this embodiment, each logical unit may be allocated a hot list and a cleaning matrix. Thus, storage device 100 may have more than one hot list and more than one cleaning matrix. In this circumstance, the system needs to determine in which cleaning matrix to operate the cleaning process. For example, the system may clean segments for the logical unit requesting a clean segment. Or, the system may clean segments for the logical unit with the best cleaning candidates. The system may determine the logical unit with the best cleaning candidates using a weighting method. For example, a logical unit's "cleaning weight" may be:

$$G = W_1 L_1 + W_2 L_2 + W_3 L_3 \ldots + W_N L_N$$

wherein W is the predetermined weight of a utilization-bucket and L is the queue length of a utilization-bucket. The logical unit with a higher cleaning weight may be cleaned before a logical unit with a lower cleaning weight.

In a still further embodiment of the invention, storage device 100 utilizes parity. In this embodiment, prior to writing the read live data, the system generates parity data for the read live data. Then, in writing the read live data to the new segment, the system also writes the parity data for the new segment.

FIGS. 9a through 9c show exemplary functional layouts for a cleaning matrix. As shown in FIGS. 9a through 9c, cleaning matrix 900 is a two-dimensional matrix with 5 columns and 5 rows. The columns represent segment utilization, moving from lowest segment utilization to highest segment utilization. The rows represent segment age, moving from youngest to oldest. The 5 column, 5 row matrix is chosen for ease of reference. The cleaning matrix may have any number of columns and any number of rows. For example, the cleaning matrix may have 3 columns and 5 rows, 6 columns and 12 rows, 10 columns and 8 rows, etc.

As shown in FIG. 9a, a segment summary resides in some, but not all, of the cells in cleaning matrix 900. For ease of reference, each cell contains a single segment summary, which is represented with a number. However, a cell may contain multiple segment summaries, describing multiple segments. Typically, the segment summaries form a linked list.

For purposes of illustration, and subsequent to the writing of the segment summaries in FIG. 9a, the system pushes down 3 segment summaries from the hot list, segment summary 500 through segment summary 502. As discussed above, these segment summaries are placed at the top of the appropriate utilization-bucket, in other words, placed in the appropriate cell in cleaning matrix 900. FIG. 9b shows the state of cleaning matrix 900 subsequent to the system placing the 3 pushed-down segment summaries in the appropriate cells in the cleaning matrix. As shown, the 3 pushed-down segment summaries are in the top row of cleaning matrix 900, and the previously pushed-down segment summaries have been "moved down" one row in cleaning matrix 900.

The system now pushes down 4 more segment summaries from the hot list, segment summary 600 through segment summary 603. FIG. 9c shows the state of cleaning matrix 900 subsequent to the system placing the pushed-down segment summaries in the appropriate cells in cleaning matrix 900. As shown, the 3 pushed-down segment summaries are in the top row of cleaning matrix 900, and the previously pushed-down segment summaries have been "moved down" one row in cleaning matrix 900. In addition, the segment summaries previously located in the fourth row of cleaning matrix 900 have now been concatenated with the segment summaries in the fifth row of cleaning matrix 900.

As shown in FIGS. 9a through 9c, the last row of cleaning matrix 900 contains, among other things, the segment summaries for the coldest segments with the highest segment utilization. The coldest segments with the highest segment utilization are the best candidates to migrate to, for example, storage level 130. Thus, in addition to using cleaning matrix 900 to locate the best segments to clean, the system uses cleaning matrix 900 to locate the best segments to migrate. The process of migration includes, for example, reading the selected segment and writing the live data from the read segment into, for example, storage level 130.

The system may migrate segments when, for example, the cleaning matrix's logical unit becomes idle. Or, the system may migrate segments when most of the segments used in, for example, cache level 120, have segment utilization over a threshold limit. The system uses the threshold limit, which varies in accordance with the performance of the log structure, to determine whether a segment should be cleaned (below threshold limit) or migrated (above threshold limit). For example, the threshold limit may be 85% live data. Thus, the system will migrate live data in segments with segment utilization equal to, or greater than, 85% live data, rather than "pack" the live data.

In addition, the system may migrate segments when the free map element list is empty, or almost empty. As discussed above, a map element describes, among other things, the starting block address for user data, the number of contiguous blocks for the user data, the segment containing the user data, and the offset to the block in the segment. Using this structure, the logical-to-physical map can keep track of contiguous user data that has been split, truncated, or overwritten. Thus, the more fragmented the user data in a log structure, the more map elements are needed to track the location of the user data in the log structure. But, because migration "moves" the user data to the log structure's back store (e.g., the back store for cache level 120 is storage level 130), migration "frees" map elements.

FIGS. 10a through 10c show exemplary functional layouts of "traversed" cleaning matrices. As discussed above, the process of traversing a cleaning matrix looking for the best segments to clean typically involves a balancing test-balancing the segment's age against the segment's utilization. FIGS. 10athrough 10c show three different balancing tests. In particular, FIG. 10ashows a balancing test that results in a substantially vertical traversal of cleaning matrix 1000. On the other hand, FIG. 10b shows a balancing test that results in a substantially diagonal traversal of cleaning matrix 1000. Last, FIG. 10c shows a balancing test that results in a mixed traversal of cleaning matrix 1000.

As shown in FIGS. 10a through 10c, the cleaning matrices are two-dimensional matrices with 5 rows and 5 columns. In addition, some of the cells in the cleaning matrices are numbered. In this example, for purposes of illustration, 13 of the cells are numbered. The numbers represent the order in which the system traverses the cleaning matrix, looking (based on the information in the segment summaries) for segments to clean. When the system locates a segment to clean (based on the information in the segment summary), the system tracks the number of live data blocks in the "found" segment. As discussed in the process shown in FIG. 8, when the system has located enough live data to write a full segment, the system then reads the live data in the found segments.

In particular, the system begins at cell number 1, looking (based on information in the segment summaries) for segments to clean. If, for example, enough live data is found in the segments described in cell number 1 and cell number 2, then the system reads the live data found in the segments. Then, after the system has cleaned the found segments, the system may repeat the process-beginning at cell number 1, cell number 2, cell number 3, etc. In the alternative, the system may begin reading the "next" location in the cleaning matrix. For example, if the last segment the system read was the second segment in cell number 3, which contains 5 segments, then the system will begin reading the third segment in cell number 3—the next location in the cleaning matrix.

In an alternate embodiment of the invention, some of the cells in the cleaning matrix may be empty. In this embodiment, the system simply moves on the next cell in the cleaning matrix. In a further alternate embodiment of the invention, one cell may describe enough segments to write a full segment. In this embodiment, the system does not need to move on to another cell before reading the live data in the found segments.

C. Allocating Log Structure Resources

The process for allocating free segment lists between more than one system includes, among other things, the system allocating a minimum number of free segments to a free segment list for each group in a disk array, as well as allocating a minimum number of free segments to a free segment list for each log-enabled logical unit in the disk array. When a logical unit needs an free segment, the logical unit first looks to the free segment list for the logical unit. If no free segments are found, then the logical unit looks to the free segment list for the logical unit's group. The systems do not need to communicate when an free segment is found on either the free segment list for the logical unit or on the free segment list for the group.

When, however, an free segment is not found, and the system controls more than one logical unit per group, then the system may re-allocate segments between the logical units in the group. For example, each system may have a "low segment watermark" and a "high segment watermark." When a logical unit requests an free segment from the free segment list for the group, the system first determines whether the percent of used segments assigned to the logical unit is below the low segment watermark, between the low segment watermark and the high segment watermark, or above the high segment watermark.

If the percent of used segments assigned to the requesting logical unit is below the low segment watermark, the system cleans a chunk of segments from the logical unit in the group with the highest percent of assigned segments-used and free. Then, the system transfers the chunk of "cleaned" segments from the "chosen" logical unit to the requesting logical unit.

If the percent of used segments assigned to the requesting logical unit is above the high segment watermark, the system requires the requesting logical unit to "clean" segments. If the percent of used segments assigned to the requesting logical unit is between the low segment watermark and the high segment watermark, the system requests, for example, a chunk of segments from the logical unit with the highest percent of assigned segments-used and free. In this circumstance, the chosen logical unit may, or may not, transfer a chunk of free segments.

In addition, a system may request free segments from a peer system. Typically, a "chunk" of free segments is transferred, in order to reduce the number of requests. If no free segments are returned from the peer system, then the system may require the requesting logical unit to clean segments.

In the same manner it is possible for the number of segments assigned to logical units to become "unbalanced" between the logical units in a group, the number of segments assigned to a system may become "unbalanced" between the systems in a disk array. Thus, a system may demand, for example, a chunk of segments from the peer system. As a result, the peer system transfers a chunk of free segments. If necessary, the peer system may need to first "clean" segments prior to the transfer of the chunk of free segments.

In general, one system may demand segments from a peer system when a "distinct imbalance" exists between the two systems. A distinct imbalance may exist, for example, when the number of segments assigned to a system is less than the total number of segments assigned to the disk array multiplied times the percent of disk spaced assigned to the system. For example, if a system is assigned 50% of the disk array's storage capacity for user data, the system should be assigned at least 50% of the segments assigned to the disk array. If the system is assigned less than 50% of the segments assigned to the disk array, then a distinct imbalance may exist between the systems.

The process for allocating free map element lists between systems includes, among other things, the system allocating a minimum number of free map elements to a free map element list for each system, as well as allocating a minimum number of free map elements to a free map element list for each log-enabled logical unit in the disk array. When a logical unit needs an free map element, the logical unit first looks to the free map element list for the logical unit. If no free map elements are found, then the logical unit looks to the free map element list for the logical unit's system. The systems do not need to communicate when an free map element is found on either the free map element list for the logical unit or on the free map element list for the system.

When, however, an free map element is not found, and the system controls more than one logical unit per group, then the system may re-allocate map elements between the logical units in the group. The re-allocation process for map elements is similar to the re-allocation process for segments. For example, each system may have a "low map element watermark" and a "high map element watermark." However, when the percent of map elements assigned to a requesting logical unit is below the low map element watermark, the system migrates chunks of segments, rather than cleans chunks of segments, from the logical unit in the group with the highest percent of assigned map elements-used and free. As discussed above, migration, rather than cleaning, frees map elements.

In addition, a system may request free map elements from a peer system. Typically, a "chunk" of free map elements is transferred, in order to reduce the number of requests. If no free map elements are returned from the peer system, then the system may request that live data on the requesting logical unit be migrated.

Further, one system may demand map elements from a peer system when a "distinct imbalance" exists between systems. A distinct imbalance may exist, for example, when the number of map elements assigned to a system is less than the total number of map elements assigned to the disk array multiplied times the percent of segments assigned to the system. For example, if a system is assigned 50% of the disk array's segments, the system should be assigned at least 50% of the map elements assigned to the disk array. If the system is assigned less than 50% of the map elements assigned to the disk array, then a distinct imbalance may exist between the systems.

D. Managing the Log Structure

At various times during the operation of a storage device configured with the hierarchical architecture described and claimed herein, the system may need to "freeze" write requests and read requests coming to and from a log structure. For example, the system may need to freeze traffic to the storage device when the log structure, for example, cache level 120, needs to be reconfigured or needs to be disabled. Also, the system should freeze traffic to the storage device when the system senses a failure, such as a power failure.

In these circumstances, the system should "deposit" the logical-to-physical map for the log structure to a "vault" disk. In other words, the system should write the contents of the logical-to-physical map for the log structure from volatile memory to non-volatile memory. Typically, non-volatile memory is a disk, referred to in this case as a vault disk. A person of skill in the art understands that the system should also deposit the contents of the memory-based cache, for example, cache level 110, to the vault disk.

It is not necessary to deposit the contents of the log structure to the vault disk because the log structure is a disk-based cache. In other words, the contents of the log structure reside in non-volatile memory. The contents of the log structure include, among other things, live data, dead data, and the segment database for each segment element in the log structure.

In contrast, like the logical-to-physical map, the segment summaries for each segment in the log structure, as well as the bit map that complements each segment summary, is memory-based. However, the segment summary and bit map for each segment may be reconstructed from the logical-to-physical map. Thus, the system does not need to deposit the segment summaries, and corresponding bit maps, to the vault disk When a disk array includes more than one system, the logical-to-physical map may be "mirrored" on each system. In other words, each system may possess a copy of the logical-to-physical map for each log structure. As discussed above, a disk array may include more than one log structure when, for example, the disk array is configured with more than one group. In this circumstance, one system deposits the contents of the logical-to-physical map to the vault disk. For example, the master system may perform the deposit to the vault disk. Or, when one system is malfunctioned, the other system may perform the deposit to the vault disk. If the system performing the deposit to the vault disk malfunctions during the process, then the other system, if available, may begin to perform the deposit to the vault disk. In this circumstance, the system which takes over the deposit process must deposit the entire logical-to-physical map to the vault disk.

E. Expanding the Log Structure

Figure 11:
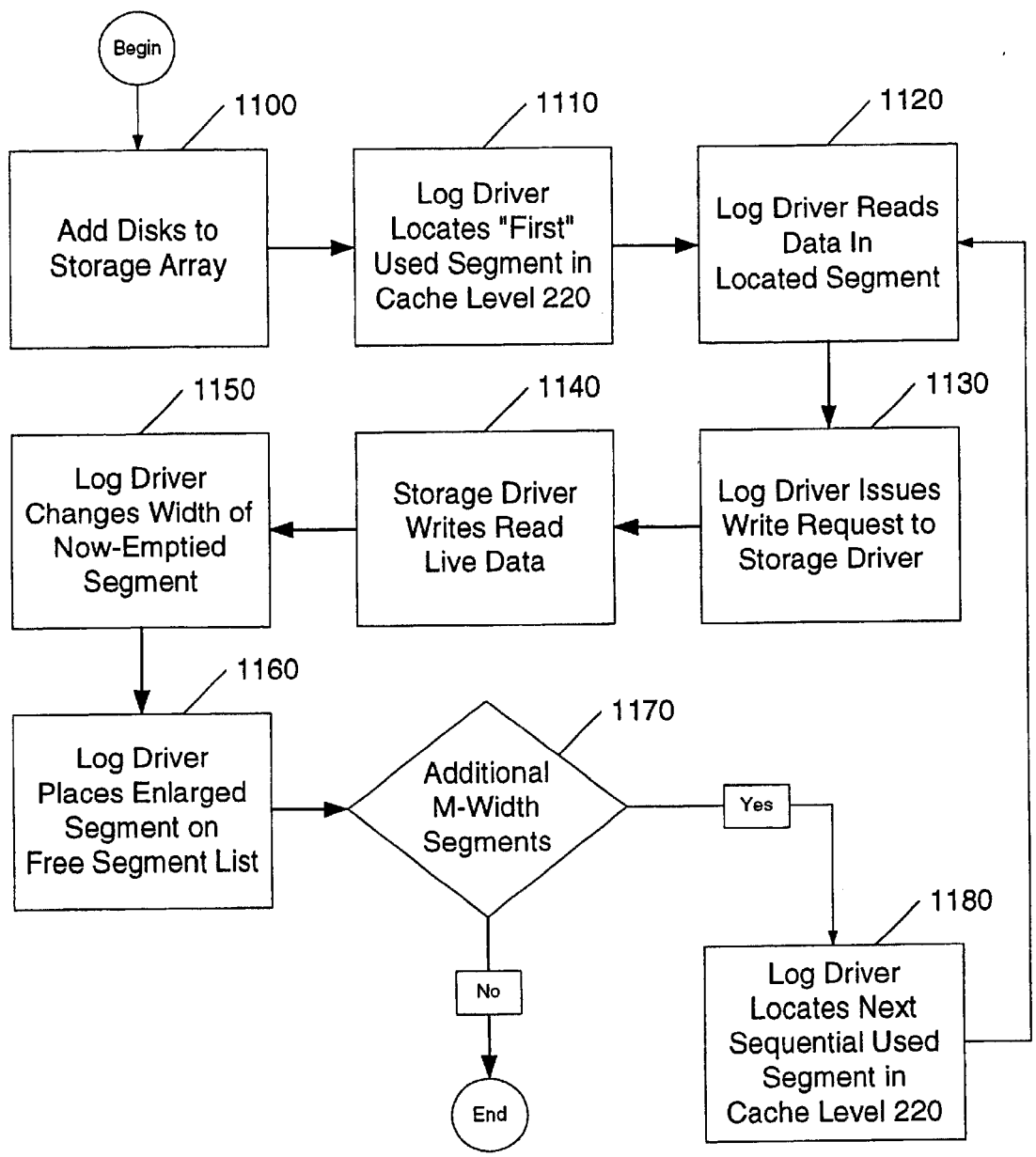
FIG. 11 shows an exemplary process for expanding a log structure in a disk array, such as the storage device shown in FIG. 2.

FIG. 11 shows an exemplary process for expanding a log structure in a disk array, such as storage device 200 shown in FIG. 2. The process begins at step 1100, in which, for example, 2 disks are added to storage device 200, disk 255 and disk 256. Next, at step 1110, the log driver locates the "first" used segment in cache level 220. As discussed above, the system writes data to cache level 220 in a sequential nature, appending data to the "end" of the structure, using segments. Thus, the first used segment in cache level 220 is the segment at the "beginning" of cache level 220. Then, at step 1120, the log driver reads the data in the located segment. At step 1130, the log driver issues a write request to the storage driver, requesting the storage driver to write the read live data to storage level 230. At step 1140, the storage driver writes the read live data.

The process continues at step 1150, in which the log driver changes the width of the now-emptied segment from M-width to N-width. Typically, as discussed above, the width of a segment in a disk array approximates the width of the disk array. Thus, in this example, M-width is 5 disks (4 user data disks and 1 parity disk) and N-width is 7 disks (6 user data disks and 1 parity disk). In addition, because a segment element approximates the width of a disk, the enlarged segment now includes two additional segment elements. Next, at step 1160, the log driver places the enlarged segment on a free segment list. Then, at step 1170, the log driver determines whether cache level 220 contains additional M-width segments. If yes, then at step 1180, the log driver locates the next sequential M-width segment in cache level 220.

Figure 12:
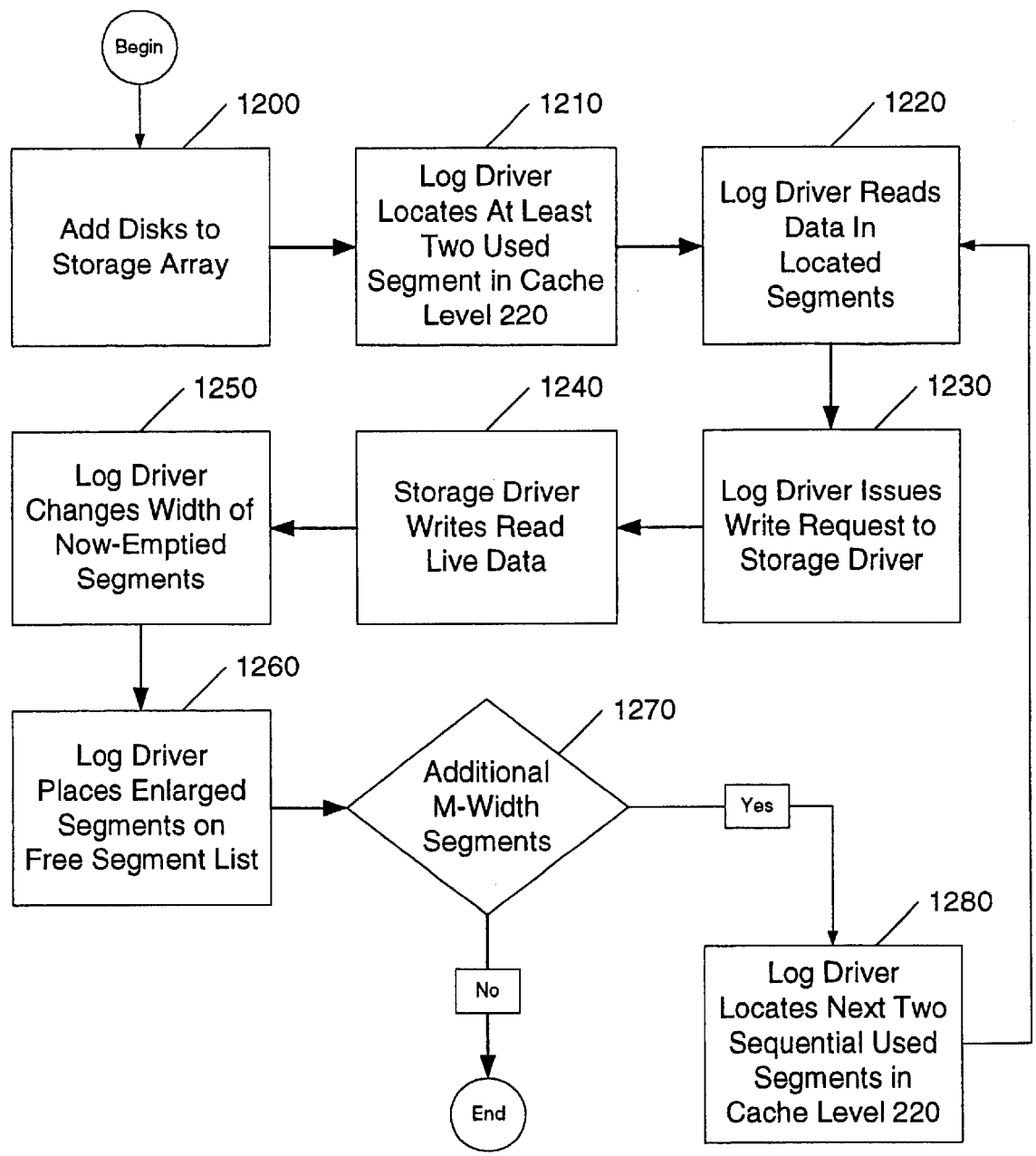
FIG. 12 shows another exemplary process for expanding a log structure in a disk array, such as the storage device shown in FIG. 2.

FIG. 12 shows another exemplary process for expanding a log structure in a disk array, such as storage device 200 shown in FIG. 2. The process begins at step 1200, in which, for example, 2 disks are added to storage device 200, disk 255 and disk 256. Next, at step 1210, the log driver locates at least two used segments in cache level 220. Then, at step 1220, the log driver reads the data in the located segments. At step 1230, the log driver issues a write request to the storage driver, requesting the storage driver to write the read live data to storage level 230. At step 1240, the storage driver writes the read live data.

The process continues at step 1250, in which the log driver changes the width of the now-emptied segments from M-width to N-width. Next, at step 1260, the log driver places the enlarged segments on a free segment list. Then, at step 1270, the log driver determines whether cache level 220 contains additional M-width segments. If yes, then at step 1280, the log driver locates, for example, the next two sequential M-width segment in cache level 220.

The storage capacity of a log structure "before" expansion may not be the same as the storage capacity of the log structure "after" expansion. In other words, the process of expanding a log structure in a disk array may, in and of itself, increase the storage capacity of the log structure. Typically, however, the number of segments per log structure before expansion is the same as the number of segments per log structure after expansion.

In a further embodiment of both inventions, the log driver may use a pointer to keep track of its "position" in the log structure during the expansion process. In addition, prior to beginning the expansion process, the log driver may clear the free segment list, or lists, for the log structure. In clearing the free segment list, or lists, the log driver ensures new segments are not written to the log structure using, for example, an M-width segment.

In a still further embodiment of the invention, the log driver uses the enlarged segments placed on the free segment list, for example, the N-width segments, to continue the operation of the log structure during the expansion process.

The various embodiments of the invention may be implemented in any conventional computer programming language. For example, the various embodiments may be implemented in a procedural programming language (for example, "C") or an object-oriented programming language (for example, "C++" or JAVA). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), pre-loaded with a computer system (for example, on system ROM or fixed disk), or distributed from a server or electronic bulletin board over the network (for example, the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for expanding a log structure in a disk array, the disk array being expanded from M-width to N-width, the disk array including a storage level, the log structure including one or more sequential used segments, the one or more sequential used segments including live data, the method comprising:

locating one or more sequential used segments;

writing live data from the one or more located segments to the storage level;

enlarging the size of the one or more located segments from M-width to N-width; and placing the one or more enlarged segments on a first free segment list.

2. The method according to claim 1 further comprising:

repeating the above four processes for at least one more sequential used segment.

3. The method according to claim 2 further comprising:

using a pointer to track progression through the log structure.

4. The method according to claim 1 further comprising:

using the one or more enlarged segments placed on the first free segment list to continue the operation of the log structure during the expansion.

5. The method according to claim 2 wherein the disk array includes a second free segment list.

6. The method according to claim 5 wherein the process of repeating the above four processes includes placing at least one enlarged segment on the second free segment list.

7. The method according to claim 6 further comprising:
using the enlarged segments placed on the first free segment list and the second free segment list to continue the operation of the log structure during the expansion.

8. The method according to claim 1 wherein the log structure is configured as a Redundant Array of Independent Disks structure.

9. The method according to claim 1 wherein the storage level is configured as a Redundant Array of Independent Disks structure.

10. A method for expanding a log structure in a disk array, the disk array being expanded from M-width to N-width, the disk array including a storage level, the log structure including unused segments and sequential used segments, the unused segments located on a first free segment list and second free segment list, the sequential used segments including live data, the method comprising:
clearing the first free segment list and the second free segment list;
locating one or more sequential used segments;
writing live data from the one or more located segments to the storage level;
enlarging the size of the one or more located segments from M-width to N-width; and
placing the one or more enlarged segments on the first free segment list.

11. The method according to claim 10 further comprising:
repeating the last four processes for at least one more sequential used segment.

12. The method according to claim 11 further comprising:
using a pointer to track progression through the log structure.

13. The method according to claim 10 further comprising:
using the one or more enlarged segments placed on the first free segment list to continue the operation of the log structure during the expansion.

14. The method according to claim 11 wherein the process of repeating the last four processes includes placing at least one enlarged segment on the second free segment list.

15. The method according to claim 14 further comprising:
using the enlarged segments placed on the first free segment list and the second free segment list to continue the operation of the log structure during the expansion.

16. The method according to claim 10 wherein the log structure is configured as a Redundant Array of Independent Disks structure.

17. The method according to claim 10 wherein the storage level is configured as a Redundant Array of Independent Disks structure.

18. A system for expanding a log structure in a disk array, the disk array being expanded from M-width to N-width, the disk array including a storage level, the log structure including sequential used segments, the sequential used segments including live data, the system comprising:
means for locating one or more sequential used segments;
means for writing live data from the one or more located segments to the storage level;
means for enlarging the size of the one or more located segments from M-width to N-width; and
means for placing the one or more enlarged segments on a first free segment list.

19. The system according to claim 18 further comprising:
means for repeating the above four processes for at least one more sequential used segment.

20. The system according to claim 19 further comprising:
means for using a pointer to track progression through the log structure.

21. The system according to claim 18 further comprising:
means for using the one or more enlarged segments placed on the first free segment list to continue the operation of the log structure during the expansion.

22. The system according to claim 19 wherein the disk array includes a second free segment list.

23. The system according to claim 22 wherein the means for repeating the above four processes includes means for placing at least one enlarged segment on the second free segment list.

24. The system according to claim 23 further comprising:
means for using the enlarged segments placed on the first free segment list and the second free segment list to continue the operation of the log structure during the expansion.

25. The system according to claim 18 wherein the log structure is configured as a Redundant Array of Independent Disks structure.

26. The system according to claim 18 wherein the storage level is configured as a Redundant Array of Independent Disks structure.

27. A system for expanding a log structure in a disk array, the disk array being expanded from M-width to N-width, the disk array including a storage level, the log structure including unused segments and sequential used segments, the unused segments located on a first free segment list and a second free segment list, the sequential used segments including live data, the system comprising:
means for clearing the first free segment list and the second free segment list;
means for locating one or more sequential used segments;
means for writing live data from the one or more located segments to the storage level;
means for enlarging the size of the one or more located segments from M-width to N-width; and
means for placing the one or more enlarged segments on the first free segment list.

28. The system according to claim 27 further comprising:
means for repeating the last four processes for at least one more sequential used segment.

29. The system according to claim 28 further comprising:
means for using a pointer to track progression through the log structure.

30. The system according to claim 27 further comprising:
means for using the one or more enlarged segments placed on the first free segment list to continue the operation of the log structure during the expansion.

31. The system according to claim 28 wherein the means for repeating the last four processes includes means for placing at least one enlarged segment on the second free segment list.

32. The system according to claim 31 further comprising:
means for using the enlarged segments placed on the first free segment list and the second free segment list to continue the operation of the log structure during the expansion.

33. The system according to claim 27 wherein the log structure is configured as a Redundant Array of Independent Disks structure.

34. The system according to claim 27 wherein the storage level is configured as a Redundant Array of Independent Disks structure.

35. A computer program product for expanding a log structure in a disk array, the disk array being expanded from M-width to N-width, the disk array including a storage level, the log structure including sequential used segments, the sequential used segments including live data, the computer program product comprising computer useable medium, the computer useable medium having computer readable program code thereon, the computer readable program code comprising:
program code for locating one or more sequential used segments;
program code for writing live data from the one or more located segment to the storage level;
program code for enlarging the size of the one or more located segments from M-width to N-width; and
program code for placing the one or more enlarged segments on a first free segment list.

36. The computer program product according to claim 35 further comprising:
program code for repeating the above four processes for at least one more sequential used segment.

37. The computer program product according to claim 36 further comprising:
program code for using a pointer to track progression through the log structure.

38. The computer program product according to claim 35 further comprising:
program code for using the one or more enlarged segments placed on the first free segment list to continue the operation of the log structure during the expansion.

39. The computer program product according to claim 36 wherein the disk array includes a second free segment list.

40. The computer program product according to claim 39 wherein the program code for repeating the above four processes includes program code for placing at least one enlarged segment on the second free segment list.

41. The computer program product according to claim 40 further comprising:
program code for using the enlarged segments placed on the first free segment list and the second free segment list to continue the operation of the log structure during the expansion.

42. The computer program product according to claim 35 wherein the log structure is configured as a Redundant Array of Independent Disks structure.

43. The computer program product according to claim 35 wherein the storage level is configured as a Redundant Array of Independent Disks structure.

44. A computer program product for expanding a log structure in a disk array, the disk array being expanded from M-width to N-width, the disk array including a storage level, the log structure including unused segments and sequential used segments, the unused segments located on a first free segment list and a second free segment list, the sequential used segments including live data, the computer program product comprising computer useable medium, the computer useable medium having computer readable program code thereon, the computer readable program code comprising:
program code for clearing the first free segment list and the second free segment list;
program code for locating one or more sequential used segments;
program code for writing live data from the one or more located segments to the storage level;
program code for enlarging the size of the one or more located segments from M-width to N-width; and
program code for placing the one or more enlarged segments on the first free segment list.

45. The computer program product according to claim 44 further comprising:
program code for repeating the last four processes for at least one more sequential used segment.

46. The computer program product according to claim 45 further comprising:
program code for using a pointer to track progression through the log structure.

47. The computer program product according to claim 44 further comprising:
program code for using the one or more enlarged segments placed on the first free segment list to continue the operation of the log structure during the expansion.

48. The computer program product according to claim 45 wherein the program code for repeating the last four processes includes program code for placing at least one enlarged segment on the second free segment list.

49. The computer program product according to claim 48 further comprising:
program code for using the enlarged segments placed on the first free segment list and the second free segment list to continue the operation of the log structure during the expansion.

50. The computer program product according to claim 44 wherein the log structure is configured as a Redundant Array of Independent Disks structure.

51. The computer program product according to claim 44 wherein the storage level is configured as a Redundant Array of Independent Disks structure.

52. A method for expanding a log structure in a disk array, the disk array being expanded from M-width to N-width, the disk array including a storage level, the log structure including one or more sequential used segments, the one or more sequential used segments including live data, the method comprising:
detecting the addition of one or more disks to the disk array;
locating one or more sequential used segments;
writing live data from the one or more located segments to the storage level;
enlarging the size of the one or more located segments from M-width to N-width; and
placing the one or more enlarged segments on a first free segment list.

53. The method according to claim 52 further comprising:
repeating the last four processes for at least one more sequential used segment.

54. The method according to claim 53 further comprising:
using a pointer to track progression through the log structure.

55. The method according to claim 52 further comprising:
using the one or more enlarged segments placed on the first free segment list to continue the operation of the log structure during the expansion.

56. The method according to claim 53 wherein the disk array includes a second free segment list.

57. The method according to claim 56 wherein the process of repeating the last four processes includes placing at least one enlarged segment on the second free segment list.

58. The method according to claim 57 further comprising:

using the enlarged segments placed on the first free segment list and the second free segment list to continue the operation of the log structure during the expansion.

59. The method according to claim 52 wherein the log structure is configured as a Redundant Array of Independent Disks structure.

60. The method according to claim 52 wherein the storage level is configured as a Redundant Array of Independent Disks structure.

61. A system for expanding a log structure in a disk array, the disk array being expanded from M-width to N-width, the disk array including a storage level, the log structure including one or more sequential used segments, the one or more sequential used segments including live data, the system comprising:

means for detecting the addition of one or more disks to the disk array;

means for locating one or more sequential used segments;

means for writing live data from the one or more located segments to the storage level;

means for enlarging the size of the one or more located segments from M-width to N-width; and means for placing the one or more enlarged segments on a first free segment list.

62. The system according to claim 61 further comprising:

means for repeating the last four processes for at least one more sequential used segment.

63. The system according to claim 62 further comprising:

means for using a pointer to track progression through the log structure.

64. The system according to claim 61 further comprising:

means for using the one or more enlarged segments placed on the first free segment list to continue the operation of the log structure during the expansion.

65. The system according to claim 62 wherein the disk array includes a second free segment list.

66. The system according to claim 65 wherein the means for repeating the last four processes includes means for placing at least one enlarged segment on the second free segment list.

67. The system according to claim 66 further comprising:

means for using the enlarged segments placed on the first free segment list and the second free segment list to continue the operation of the log structure during the expansion.

68. The system according to claim 61 wherein the log structure is configured as a Redundant Array of Independent Disks structure.

69. The system according to claim 61 wherein the storage level is configured as a Redundant Array of Independent Disks structure.

70. A computer program product for expanding a log structure in a disk array, the disk array being expanded from M-width to N-width, the disk array including a storage level, the log structure including one or more sequential used segments, the one or more sequential used segments including live data, the computer program product comprising computer useable medium, the computer useable medium having computer readable program code thereon, the computer readable program code comprising:

program code for detecting the addition of one or more disks to the disk array;

program code for locating one or more sequential used segments;

program code for writing live data from the one or more located segments to the storage level;

program code for enlarging the size of the one or more located segments from M-width to N-width; and program code for placing the one or more enlarged segments on a first free segment list.

71. The computer program product according to claim 70 further comprising:

program code for repeating the last four processes for at least one more sequential used segment.

72. The computer program product according to claim 71 further comprising:

program code for using a pointer to track progression through the log structure.

73. The computer program product according to claim 70 further comprising:

program code for using the one or more enlarged segments placed on the first free segment list to continue the operation of the log structure during the expansion.

74. The computer program product according to claim 71 wherein the disk array includes a second free segment list.

75. The computer program product according to claim 74 wherein the program code for repeating the last four processes includes program code for placing at least one enlarged segment on the second free segment list.

76. The computer program product according to claim 75 further comprising:

program code for using the enlarged segments placed on the first free segment list and the second free segment list to continue the operation of the log structure during the expansion.

77. The computer program product according to claim 71 wherein the log structure is configured as a Redundant Array of Independent Disks structure.

78. The computer program product according to claim 71 wherein the storage level is configured as a Redundant Array of Independent Disks structure.

* * * * *